US010805870B1

(12) United States Patent
Jin

(10) Patent No.: US 10,805,870 B1
(45) Date of Patent: Oct. 13, 2020

(54) WIRELESS COMMUNICATION MANAGEMENT SYSTEM AND PRIVATE ELECTRONIC COMMUNICATION NETWORK

(71) Applicant: Star Solutions International Inc., Richmond (CA)

(72) Inventor: Yichuang Eddie Jin, Vancouver (CA)

(73) Assignee: Star Solutions International Inc., Richmond (CA)

( * ) Notice: Subject to any disclaimer, the term of this patent is extended or adjusted under 35 U.S.C. 154(b) by 0 days.

(21) Appl. No.: 16/365,356

(22) Filed: Mar. 26, 2019

(51) Int. Cl.
*H04W 48/16* (2009.01)
*H04W 56/00* (2009.01)
*H04L 5/00* (2006.01)
*H04L 29/06* (2006.01)
*H04W 48/18* (2009.01)

(52) U.S. Cl.
CPC .......... *H04W 48/16* (2013.01); *H04L 5/0048* (2013.01); *H04L 69/18* (2013.01); *H04W 48/18* (2013.01)

(58) Field of Classification Search
CPC ............. H04W 1/7087; H04W 1/7156; H04W 1/7183; H04W 7/2048; H04W 7/2125; H04W 7/2662; H04W 7/2665; H04W 7/2668; H04W 7/2671; H04W 7/2675; H04W 7/2678; H04W 7/2687–2696
See application file for complete search history.

(56) References Cited

U.S. PATENT DOCUMENTS

| | | | |
|---|---|---|---|
| 6,498,784 B1 | 12/2002 | Ozluturk | |
| 6,813,252 B2 | 11/2004 | Chang et al. | |
| 8,248,912 B2 | 8/2012 | Chen et al. | |
| 8,811,142 B2 | 8/2014 | Wang et al. | |
| 8,958,753 B2 | 2/2015 | Wang et al. | |
| 9,237,515 B2 | 1/2016 | Wang | |
| 2005/0143082 A1 | 6/2005 | Yang | |
| 2007/0142053 A1* | 6/2007 | Soliman | H04W 16/32 455/446 |

(Continued)

FOREIGN PATENT DOCUMENTS

| | | |
|---|---|---|
| EP | 0856999 A2 | 8/1998 |
| EP | 0 766 416 B1 | 7/2004 |
| WO | 2006039936 A1 | 4/2006 |

OTHER PUBLICATIONS

Extended European Search Report and Written Opinion, EP Application No. 20165633.7, dated Aug. 25, 2020, 9 pages.

*Primary Examiner* — San Htun
(74) *Attorney, Agent, or Firm* — McDonnell Boehnen Hulbert & Berghoff LLP

(57) ABSTRACT

An apparatus for managing wireless electronic communication signals, comprises a signal monitor configured to detect a wireless electronic communication signal with an original phase and a frequency within a range of frequencies; a signal analyzer configured to identify a communication protocol associated with the wireless electronic communication signal; a cancellation module configured to generate a cancellation signal; and a transmitter configured to transmit the cancellation signal throughout a cancellation area. The cancellation signal is formatted to oppose at least some information that was both carried by the wireless electronic communication signal and formatted in accordance with the communication protocol. Methods of using this apparatus are also disclosed.

17 Claims, 25 Drawing Sheets

(56) References Cited

U.S. PATENT DOCUMENTS

| | | | |
|---|---|---|---|
| 2007/0149242 A1 | 6/2007 | Kim et al. | |
| 2009/0181669 A1* | 7/2009 | Naka | H04L 5/0007 455/434 |
| 2011/0310882 A1* | 12/2011 | Li | H04L 7/0054 370/350 |
| 2012/0088499 A1* | 4/2012 | Chin | H04W 24/10 455/426.1 |
| 2012/0264483 A1* | 10/2012 | Chin | H04W 68/00 455/552.1 |
| 2014/0094169 A1* | 4/2014 | Takano | H04W 48/16 455/434 |

\* cited by examiner

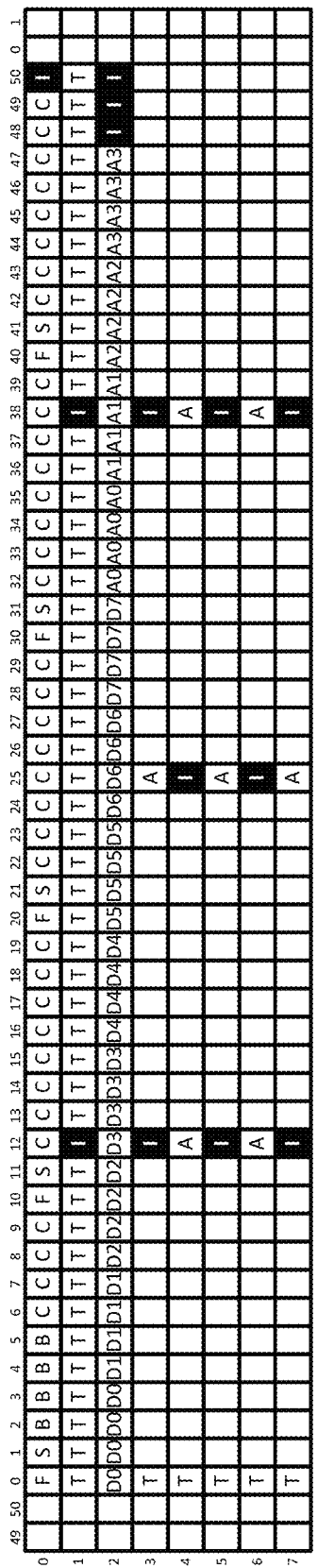
FIG. 5A
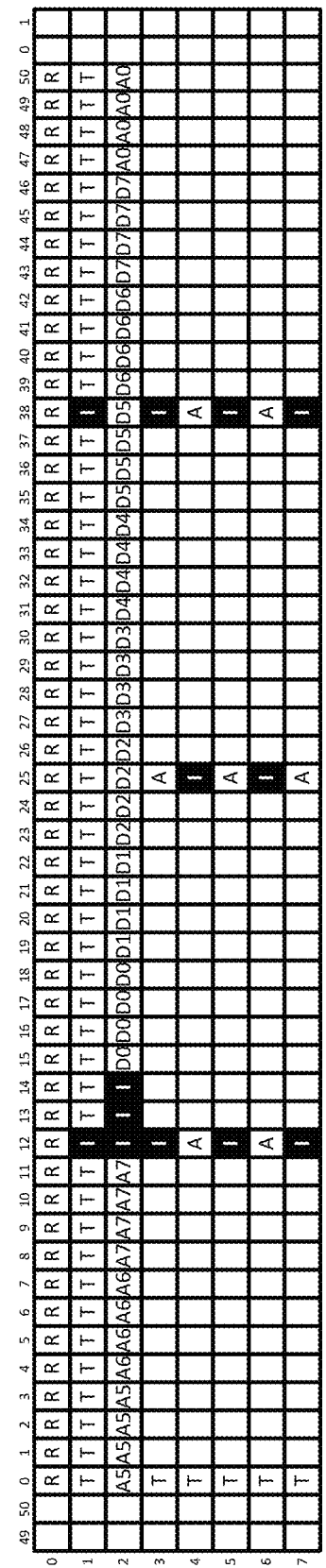
FIG. 5B
FIG. 5C

FIG. 6A

| T | ALL BITS SET TO ZERO IN FREQUENCY CORRECTION BURST | T | GP |
|---|---|---|---|
| 3 | 142 | 3 | 8.25 |

BITS

FIG. 6B

| T | INFO | LONG TRAINING SEQUENCE | INFO | T | GP |
|---|---|---|---|---|---|
| 3 | 39 | 64 | 39 | 3 | 8.25 |

BITS

FIG. 6C

| T | INFO | F | TRAINING | F | INFO | T | GP |
|---|---|---|---|---|---|---|---|
| 3 | 57 | 1 | 26 | 1 | 57 | 3 | 8.25 |

BITS

FIG. 6D

| T | TRAIN | DATA | T | GUARD PERIOD |
|---|---|---|---|---|
| 3 | 41 | 36 | 3 | 69.25 |

BITS

WIRELESS COMMUNICATION MANAGEMENT SYSTEM AND PRIVATE ELECTRONIC COMMUNICATION NETWORK

BACKGROUND

Wireless electronic communication methods and devices have evolved greatly from simple systems carrying voices on carrier waves to complex multi-carrier communication protocols. Among the features shared by modern wireless electronic communication protocols are abilities to detect the presence of a wireless communication network, to determine which one of a number of wireless electronic communication protocols is used by a network, and to synchronize radio communications between a mobile wireless electronic communication device and a network access point. Typically, these features are implemented by publicly broadcasting certain signals that are unique to a specific protocol and that can be used for synchronization.

Publicly broadcasting this information can provide an advantage when a network must support a large number or wide variety of mobile wireless electronic communication devices. This same public broadcast also has the disadvantage of permitting any device that can operate using the same protocol as the network to discover and potentially join the network, thereby creating potential network security and management issues. Therefore, there is a need for methods and apparatuses that can address mobile wireless electronic communication device access and management concerns at the physical link layer of the wireless electronic communication protocols used.

SUMMARY

Wireless electronic communication networks generally enjoy open architectures that freely permit mobile wireless electronic communication devices to detect a network and join that network, at least as far as establishing a connection at the physical link layer. This is useful in many applications. In installations where communication security is a concern, such an architecture can be a concern because the physical link layer is unprotected and potentially provides easier access to services of the network. Even where open access is normally desired, temporary circumstances such as natural disasters or other catastrophes may provide a need to restrict access to the network.

Restricting network access at the physical link layer can have significant benefits. For example, in prison settings, inmates are not permitted to possess mobile wireless electronic communication devices. Such devices are considered to be contraband. Nevertheless, mobile wireless electronic communication devices are sometimes smuggled into prisons. Once inside, such devices can access public network communications facilities and permit inmates to bypass communication restrictions of whatever facility in which they have been incarcerated. Methods and apparatuses for preventing contraband devices from accessing wireless electronic communication networks can help make prisons safer and more secure.

During natural disasters such as floods or earthquakes, or during catastrophes such as fires, wireless electronic communication networks can be overwhelmed with very large numbers of devices attempting to access the network simultaneously as people affected by the disaster or catastrophe attempt to contact others. This situation can make it difficult or impossible for first responders to access wireless electronic communication networks to coordinate relief efforts. Methods and apparatuses for preventing devices from accessing public wireless electronic communication networks can help improve communications for first responders by assisting in moving wireless electronic communication devices of first responders onto a private network and restricting access to that private network to the wireless electronic communication devices of those first responders, thereby enabling first responders to communicate with each other and more efficiently provide relief efforts. Many other examples of situations where an ability to control network access at the physical link layer exist and will be appreciated by those in this art area from reading this disclosure, but additional examples are not listed here for brevity.

An apparatus for managing wireless electronic communication signals can comprise a signal monitor configured to detect a wireless electronic communication signal with an original phase and a frequency within a range of frequencies. A signal analyzer can be configured to identify a communication protocol associated with the wireless electronic communication signal. A cancellation module can be configured to generate a cancellation signal and send that cancellation signal to a transmitter that can be configured to transmit the cancellation signal throughout a cancellation area. The cancellation signal can be formatted to oppose with at least some information that was both carried by the wireless electronic communication signal and formatted in accordance with the communication protocol. In alternative embodiments, the cancellation signal can be formatted to interfere with the carried information.

A clock generator can be configured to permit the signal analyzer to determine a start time for a message formatted in accordance with the communication protocol. The communication protocol can be Global System for Mobile Communications (GSM), Long Term Evolution (LTE), code division multiple access (CDMA), code division multiple access—evolution data only (CDMA EVDO), or third generation (3G) wireless protocols including Universal Mobile Telecommunications Service (UMTS) and high speed packet access (HSPA), among other suitable cellular wireless communication protocols.

The cancellation signal can include a generated logical zero value in slot 0 of at least one of frames 10, 20, 30, and 40. Additionally or alternatively, the cancellation signal can include a logical value −1 for each logical value of 1 in the wireless electronic communication signal and a logical value of 1 for each logical value of −1 in the wireless electronic communication signal. Still additionally or alternatively, the cancellation signal can include at least one of a P-Sync, S-Sync, and MIB symbol phase-shifted by one hundred eighty degrees. Yet still additionally or alternatively, the cancellation signal can include at least one of a pilot signal and a sync signal phase-shifted by one hundred eighty degrees.

The cancellation module can be configured to align the cancellation signal at the start of at least one frame and at least one superframe. Additionally or alternatively, the cancellation signal can include a pilot signal that includes a logical 1 value in each position. Further, the cancellation module can be configured to insert the cancellation signal into a pilot signal position of at least one frame.

A signal combiner can combine at least one cancellation signal from each of at least two communication protocols into a combined cancellation signal and to send the combined cancellation signal to the transmitter. Additionally or alternatively, a private wireless communication network can be configured to operate in accordance with a wireless communication protocol along with the apparatus for managing wireless electronic communication signals and within a cancellation zone for a public wireless electronic communication network.

A method for managing wireless electronic communication signals can comprise the steps of monitoring a range of frequencies to detect a wireless electronic communication signal with an original phase and frequency; analyzing a detected wireless electronic communication signal to identify a communication protocol; generating a cancellation signal based at least in part upon an identified communication protocol by phase-shifting at least part of the detected wireless electronic communication signal by one hundred eighty degrees from the original phase; and transmitting the cancellation signal throughout a cancellation area. The step of analyzing a detected wireless electronic communication signal can include using a clock generator to determine a start time for a data packet formatted in accordance with the identified communication protocol. The method can further comprise the steps of combining at least one cancellation signal from each of at least two identified communication protocols into a combined cancellation signal and transmitting the combined cancellation signal throughout the cancellation area. Still further, the method can comprise the step of operating a private wireless communication network within the cancellation area and in accordance with the identified communication protocol.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 5A and 5B are data maps of downlink and uplink communication formats that can be used in the GSM wireless communication protocol.

FIG. 5C is a legend for FIGS. 5A and 5B.

FIGS. 6A, 6B, 6C, and 6D are data maps depicting various transmission bursts used in the GSM wireless communication protocol.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Figure 1:
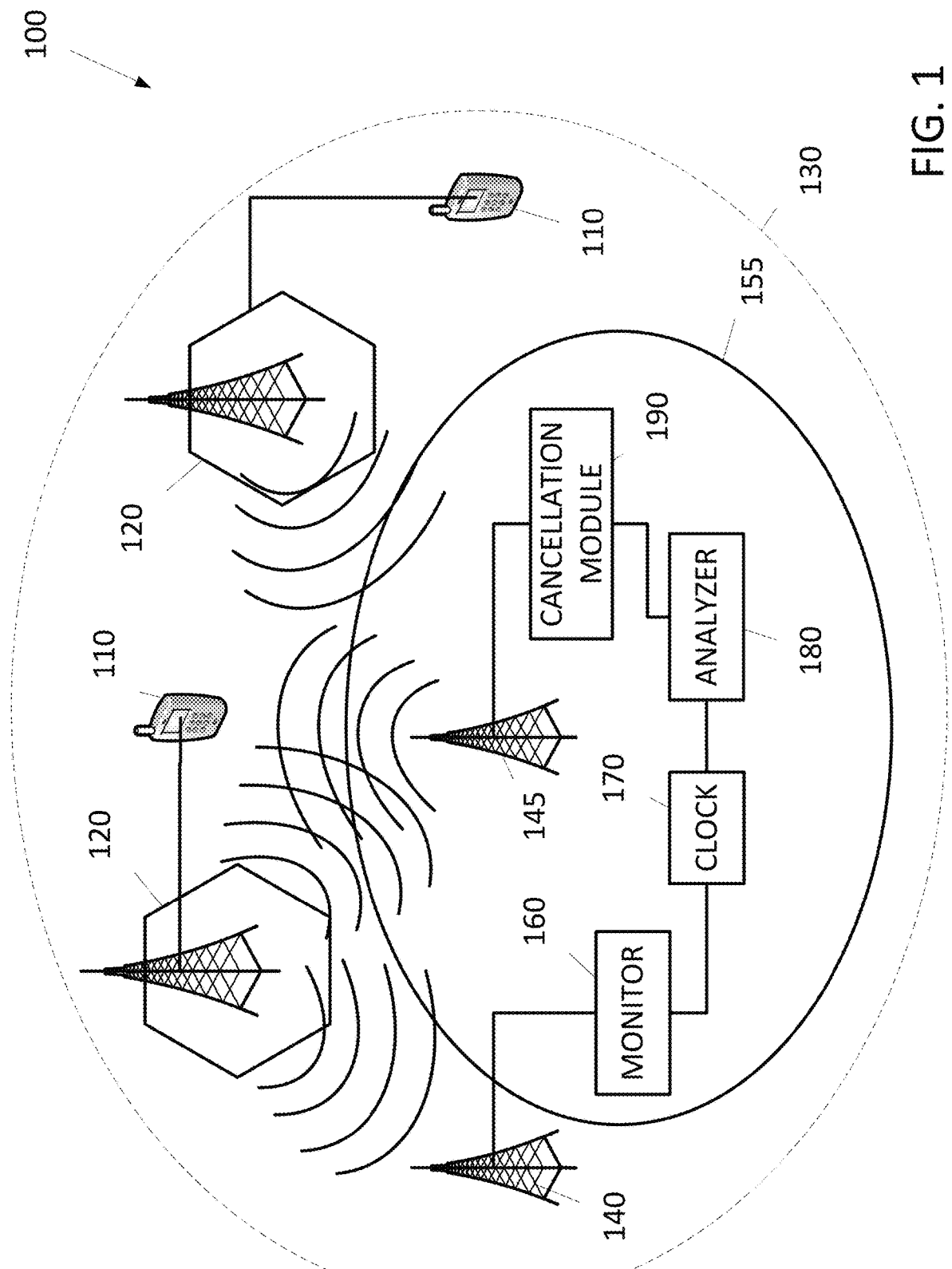
FIG. 1 is a system block diagram of a wireless electronic communication management system.

FIG. 1 is a system block diagram of a wireless electronic communication management system 100. The wireless electronic communication management system 100 can be used to manage wireless electronic communications between one or more mobile communication devices 110 with wireless electronic communication capabilities and one or more wireless communication access points 120. Each of the one or more mobile communication devices 110 can be a cellular telephone, a smartphone, a tablet computing device, a mobile computer, or another appropriate communication or computing device. A combined service range of the one or more wireless communication access points can establish a wireless electronic communication service area designated by service boundary 130.

In this example, each wireless communication access point 120 is shown as a cellular communication tower. Each such cellular communication tower can provide wireless electronic communication facilities according to one or more established wireless communication protocols, such as Global System for Mobile Communications (GSM), Long Term Evolution (LTE), code division multiple access (CDMA), code division multiple access—evolution data only (CDMA EVDO), or third generation (3G) wireless protocols including Universal Mobile Telecommunications Service (UMTS) and high speed packet access (HSPA), among other suitable cellular wireless communication protocols. It should be noted that for simplicity and ease of reading, examples of possible implemented systems discuss specific cellular telephony protocols, but the systems and methods disclosed and described here can be employed with other suitable wireless communication protocols, including those based on specifications or standards promulgated by the Institute of Electrical and Electronics Engineers (IEEE) under its 802.11x and 802.16 families in existence on the date of filing. It should also be noted that because basic wireless electronic communication techniques such as the use of predefined data formats, data burst timings, code division multiplexing, and time division multiplexing, among others, are expected to be used in future wireless electronic communication protocols, it is specifically contemplated that the apparatuses and methods disclosed and described below can be readily adapted for use with protocols that may be adopted after the date of filing.

The wireless electronic communication management system 100 can include a receiver 140 and a transmitter 145. It should be noted that the receiver 140 and the transmitter 145 can be implemented as a single transceiver (not shown). The receiver 140 and the transmitter 145 can be used with other components of the wireless electronic communication management system 100 to establish a cancellation zone 150. The cancellation zone is depicted within cancellation boundary 155.

The cancellation zone can be created using at least one of two methods. A nullification method can involve the generation and broadcast of a signal that has been phase shifted one hundred eighty degrees from a phase of a signal broadcast by a wireless electronic communication access point operating in accordance with a wireless electronic communication protocol. In one example, the signal nullification method can be employed for protocols that use a pilot signal, but is not limited to those protocols for its use. In an example of use of signal nullification, a signal formatted to interfere with a device's ability to obtain all information necessary to join a wireless electronic communication network operating in accordance with a wireless electronic communication protocol can be broadcast. Unless context clearly requires limitation to either signal nullification or signal interference, the cancellation techniques discussed below can include either signal nullification, signal interference, or both signal nullification and signal interference.

The receiver 140 can be coupled to a monitor 160, which in turn can be coupled to a clock 170. The clock 170 can include an oscillator to produce various clock frequencies that are used by various wireless communication protocols, such as the ones discussed above. The monitor 160 can use the frequencies generated by the clock 170 to determine whether a wireless electronic signal received by the receiver 140 is a signal on a frequency that is known to be used by one or more of the various wireless communication protocols of interest for a specific implementation of the wireless electronic communication management system 100.

An analyzer 180 can determine whether a wireless electronic signal determined by the monitor 160 to be on a frequency of interest is formatted in a manner that is associated with a wireless communication protocol. A cancellation module 190 can determine an appropriate cancellation signal format to broadcast to cancel out information carried by the signal in accordance with the wireless communication protocol. The transmitter 145 can transmit the cancellation signal throughout the cancellation zone 150 to prevent communication between the one or more mobile communication devices 110 and the one or more wireless communication access points 120. Please note that throughout this disclosure, the terms mobile communication device, mobile computing device, mobile station (MS), and user equipment (UE) are used to refer to devices that typically do not have fixed installations and that use one or more wireless electronic communication protocols to communicate with typically fixed or otherwise persistent stations such as cellular telephone towers or wireless access points, regardless of whether such wireless access points are in fixed locations.

Figure 2:
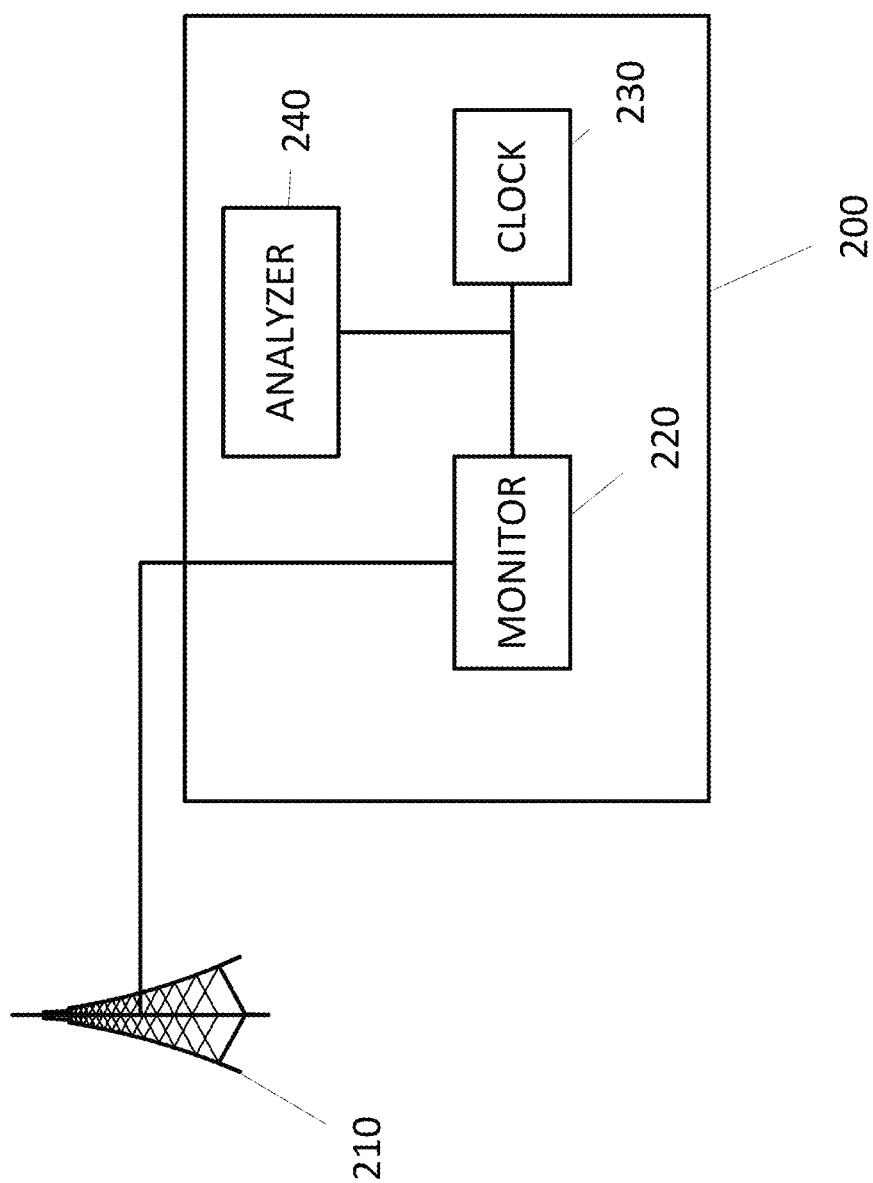
FIG. 2 is a system block diagram of a scanner.

FIG. 2 is a system block diagram of a scanner 200. The scanner 200 can include a monitor 220, a clock 230, and an analyzer 240. Specifically, the scanner 200 can be implemented to provide functionality of the monitor 160, the clock 170, and the analyzer 180 depicted in FIG. 1 and described above. The scanner 200 can also be implemented differently for another suitable system.

A transceiver 210 can connect to the scanner 200. In a similar manner as with the scanner 200, the transceiver 210 can be implemented to provide the functionality of the receiver 140 and the transmitter 145 described above in conjunction with FIG. 1. The scanner 200 can also be modified for a different implementation as desired and as consistent with the techniques disclosed and described here.

In order to identify a wireless electronic communication signal, the scanner 200 can employ techniques similar to those used by mobile stations, including mobile communication devices such as the mobile communication device 110 of FIG. 1, to access available wireless communication networks. Generally, these techniques involve monitoring broadcast signals from wireless base stations and access points, such as each of the wireless communication access points 120 shown in FIG. 1, analyzing a received signal, and determining whether the received signal is associated with a wireless electronic communication protocol. Specific applications of these general techniques can vary according to specifics of each wireless electronic communication protocol involved.

Figure 3:
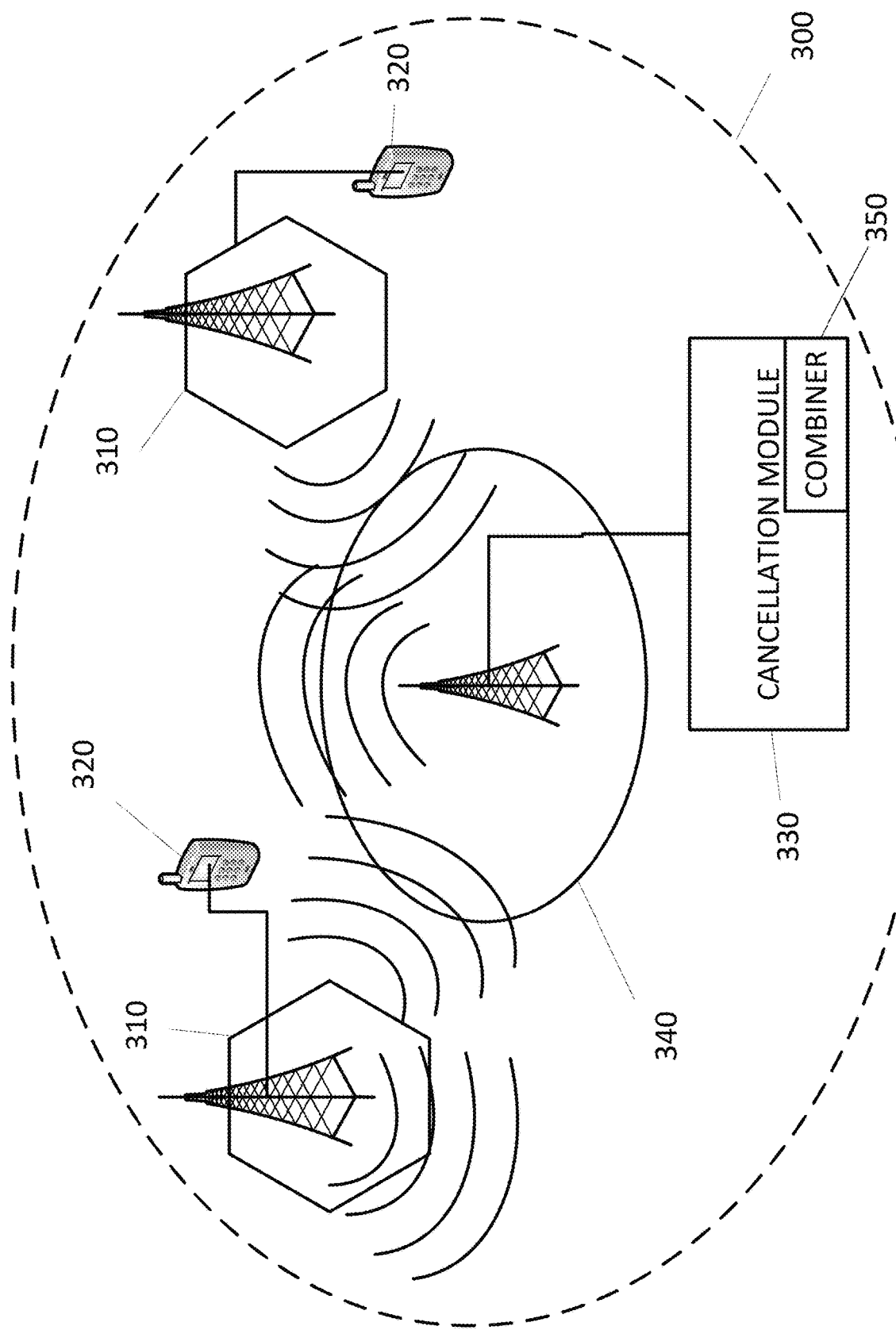
FIG. 3 is a system block diagram of a cancellation module and a transmitter that can be used to establish a cancellation zone.

FIG. 3 is a system block diagram of a cancellation module and a transmitter that can be used to establish a cancellation zone. Within a boundary 300, one or more wireless electronic communication access points 310 can operate in accordance with one or more wireless electronic communication protocols to provide network access to one or more mobile stations 320. A cancellation module 330 can create a cancellation signal that is based at least in part upon information the cancellation module can obtain from a scanner, such as the scanner 200 described above and shown in FIG. 2. As mentioned above, the cancellation signal can be a signal that has been phase-shifted one hundred eighty degrees from at least a portion of a received signal, such as a sync signal.

The cancellation module 330 can send the cancellation signal to a transmitter 340. The transmitter 340 can transmit the cancellation signal throughout its transmission range to establish a cancellation zone within which each mobile station 320 can be prevented from joining a network through use of one or more of the wireless electronic communication access points 310. The cancellation module 330 can optionally include a combinator 350 that can be configured to combine cancellation signals for two or more wireless electronic communication protocols into a single signal to be broadcast throughout the cancellation zone.

In operation, a wireless electronic communication management system such as the wireless electronic communication management system 100 shown in FIG. 1 can be used to create a cancellation zone within which mobile stations, such as the mobile communication devices 110 shown in FIG. 1, can be prevented from attaching to a network through one or more wireless access points within the cancellation zone. Specific examples based on various wireless electronic communication protocols are provided below.

A first example is based on the GSM cellular communication protocol. Specifically, this example is based on European Telecommunication Standards Institute (ETSI) publication ETSI EN 300 910 v8.5.1. (2000-11) titled Digital cellular telecommunications system (Phase 2+); Radio transmission and reception (GSM 05.05 version 8.5.1 Release 1999). The apparatuses and methods disclosed and described can also be used in conjunction with other versions of the GSM standard, possibly with minor modifications that will be apparent to those having an ordinary level of skill in this area.

Figure 4:
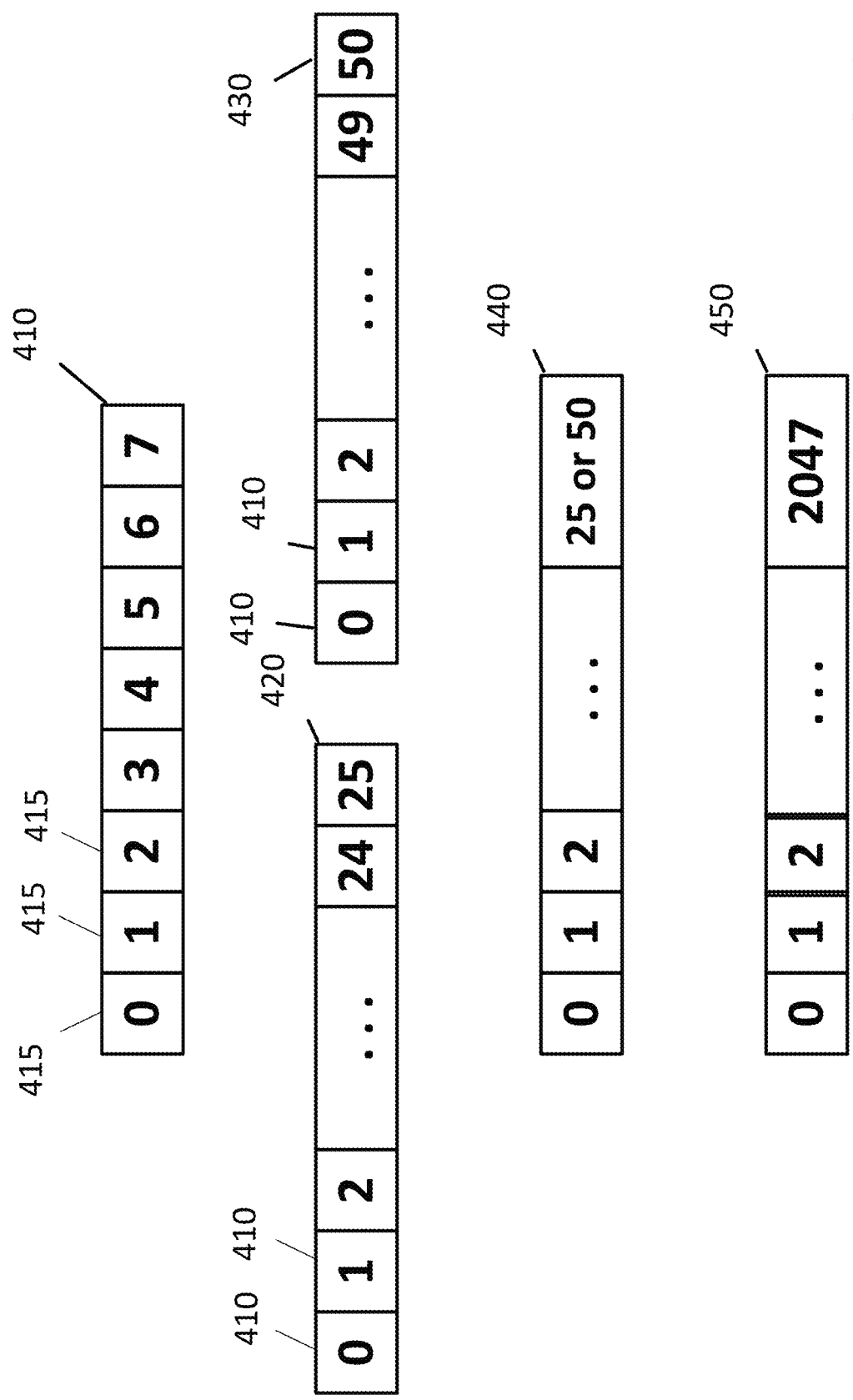
FIG. 4 is a data map that depicts formats for the GSM wireless communication protocol.

FIG. 4 is a data map that depicts formats for the GSM wireless communication protocol. Each frame 410 includes 8 time slots 415. Each of the 8 time slots 415 has a duration of approximately 15/26 milliseconds (ms). A traffic multiframe 420 includes 26 frames 410 and can be transmitted over a duration of approximately 120 ms. A control multiframe 430 includes 51 frames and can be transmitted over a duration of approximately 235 ms.

A 26×51 superframe 440 can include 26 control multiframes or 51 traffic multiframes. The 26×51 superframe 440 can be transmitted over a duration of approximately 6.12 seconds (s). A 2048 hyperframe 450 can include 2048 superframes that can be grouped together and can be broadcast and repeat over a duration of approximately 3 hours, 28 minutes, 53 s, 760 ms.

The frame structure depicted in FIG. 4 can provide a framework to enable devices operating according to the GSM wireless communication protocol to synchronize communications. Such synchronization permits each such device to identify data types, including control and information data. This synchronization also permits features such as frequency hopping and encryption to be implemented.

FIGS. 5A and 5B are data maps 510 and 520 of downlink and uplink communication formats that can be used in the GSM wireless communication protocol. Each of these data maps show positions of various data types. A legend for the various data types depicted is in FIG. 5C.

In the downlink data map 510, position 0,0 is occupied by frequency correction channel (FCCH) information. This is followed by synchronization channel (SCH) data in position 0,1. Positions 0,2-0,5 hold broadcast control channel (BCCH) information. Common control channel (CCCH) data occupies positions 0,6-0,9. Position 0,10 holds FCCH information, as do positions 20, 30, and 40 of row 0. SCH information can be found in positions 11, 21, 31, and 41 of row 0. Most of the remainder of the positions in row 0 are occupied by CCCH data.

Row 1 primarily includes traffic channel (TCH) data. Row 2 includes stand-alone dedicated control channel (SDCCH) data followed by slow associated control channel (SACCH) data. The remainder of the positions in the downlink data map 410 are assigned to TCH data, SACCH data, or are open for information transfer.

In the uplink data map 520, positions in row 0 are reserved for random access procedure (RACH) data. The majority of positions in row 1 are dedicated to TCH data, with position 1,25 dedicated to SACCH data. Positions in row 2 are used for SACCH and SDCCH data. Positions in remaining rows are used for TCH data, SACCH data, and information transfer.

FIGS. 6A-6D are data maps depicting various transmission bursts used in the GSM wireless communication protocol. FIG. 6A depicts a frequency correction burst. All bits in the frequency correction burst can be set to logical zeros to supply a constant frequency carrier with no phase alteration.

A synchronization burst format is shown in FIG. 6B. Synchronization bursts can be used to synchronize mobile stations on a GSM network. FIG. 6C depicts the format of a normal burst, used both for uplink and downlink communication between a base station and a mobile station, such as a mobile communication device 120 shown in FIG. 1. A random access burst format is shown in FIG. 6D. Random access bursts can be used to access a network and includes a relatively long guard period to ensure that the random access burst fits in any time slot.

Figure 7:
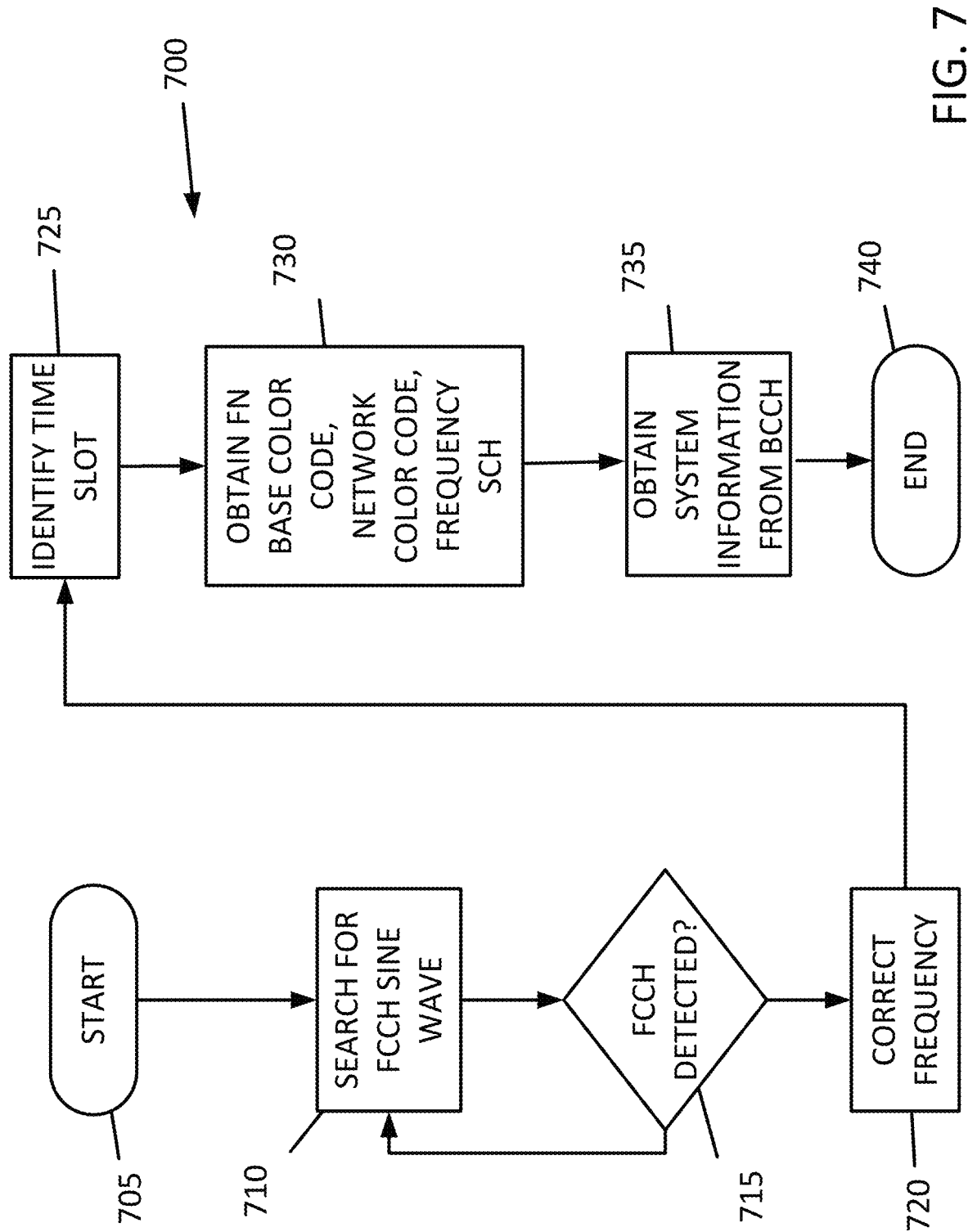
FIG. 7 is a flow diagram depicting a method that can be used by a scanner to detect a GSM wireless communication network.

FIG. 7 is a flow diagram depicting a method 700 that can be used by a scanner to determine whether a wireless electronic communication network using the GSM wireless communication protocol is active in the scanner's service area. Execution of the method 700 begins at START block 705. At process block 710, a scanner, such as the scanner 200 described in conjunction with FIG. 2, attempts to detect an FCCH sine wave. At decision block 715 a determination is made whether the scanner has detected the FCCH signal. If the determination is NO, processing returns to process block 710. If the determination is YES, execution of the method 700 continues to process block 720 where the scanner uses the detected FCCH signal to perform a frequency correction. Processing then continues to process block 725 to identify one or more time slots of that frame in which the FCCH signal was received by the scanner. At process block 730, the scanner can use the time slot information to determine that SCH information appears at the same time slot of the next frame and obtain a frame number (FN), base station color code, and network color code, start of the 51 multiframe, and FCCH channel signal strength.

Processing of the method 700 continues at process block 735 where the scanner can obtain system information from BCCH. This system information can include a mobile country code (MCC), a mobile network code (MNC), a location area code (LAC), and cell selection parameters. Processing of the method 700 concludes at END block 740.

Figure 8:
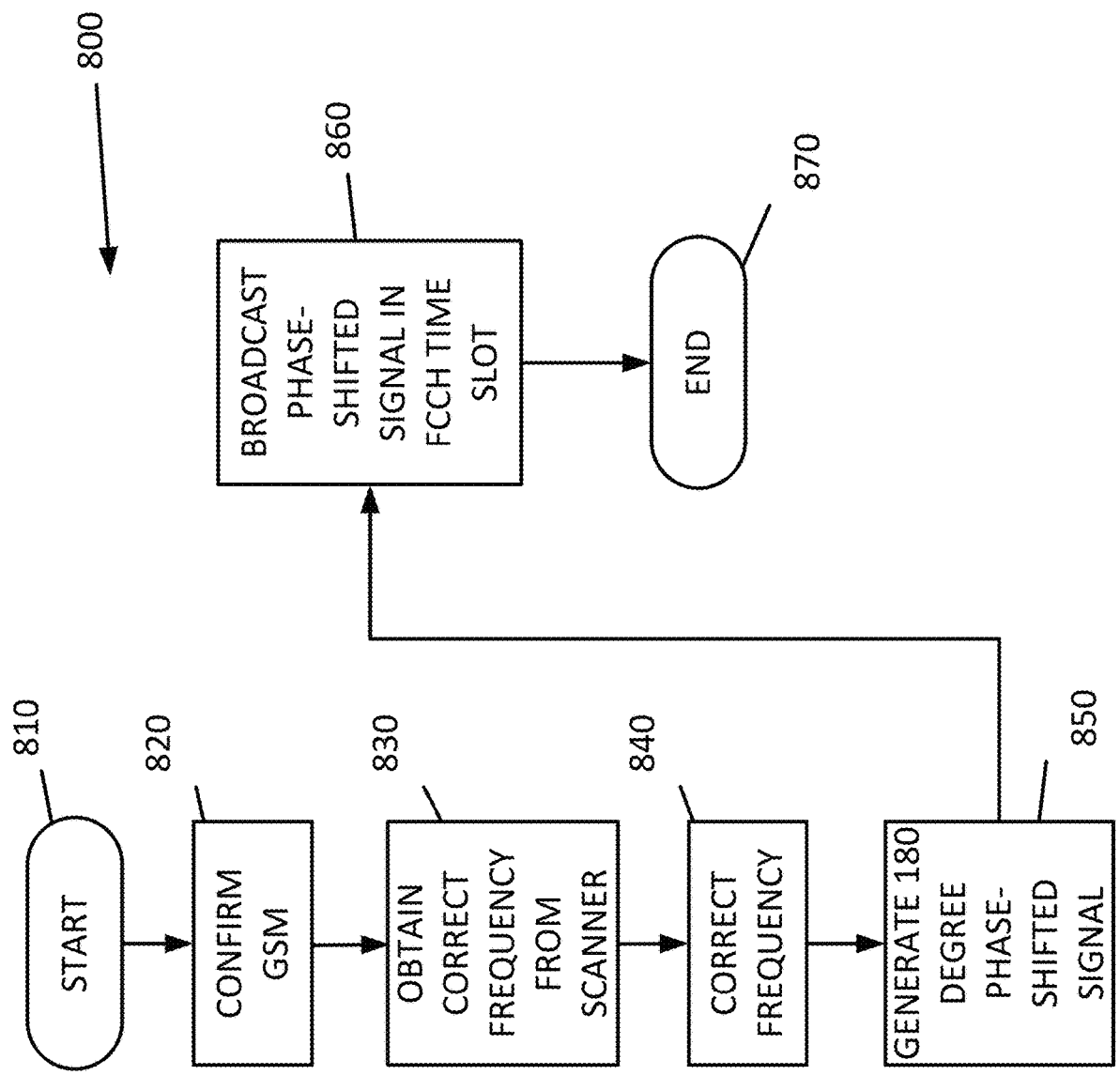
FIG. 8 is a flow diagram depicting a method that can be used by a cancellation module.

FIG. 8 is a flow diagram depicting a method 800 that can be used by a cancellation module, such as the cancellation module 330 described in conjunction with FIG. 3, to prevent a mobile station, such as the mobile communication device 100 described above in conjunction with FIG. 1, from successfully attaching to a wireless electronic communication network operating in accordance with the GSM communication protocol or a similar protocol. Execution of the method 800 begins at START block 810. At process block 820 the cancellation module can confirm that a cancellation signal is to be generated for a GSM network. This confirmation can be received from, a scanner, such as the scanner 200 described in conjunction with FIG. 2.

Execution of the method 800 continues to process block 830 where the cancellation module obtains corrected frequency information from the scanner. At process block 840, the cancellation module sets the frequency it will use for a cancellation signal in accordance with the corrected frequency information it previously obtained. Processing then continues at process block 850 where the cancellation module generates a cancellation signal.

As one possible embodiment, the cancellation module can generate a nullification signal that includes an FCCH signal that is phase-shifted 180 degrees from the phase of the FCCH signal that was detected by the scanner to cancel out a downlink FCCH signal. This phase-shifted signal can have a frequency of approximately 67.7 KHz and be inserted into slot 0 of each of frames 0, 10, 20, 30, and 40.

Processing continues at process block 860. The cancellation module can send the cancellation signal to a transmitter. The transmitter can broadcast the cancellation signal as a downlink signal to create a cancellation zone within the broadcast limits of the transmitter. Processing of the method 800 terminates at END block 870.

A second example is based on the group of technologies that are included in the 3G or UMTS cellular communication protocols. Specifically, this example is based on such specifications in existence beginning in 1999 available from the 3rd Generation Partnership Project (3GPP). Because 3GPP publishes interrelated specifications that each focus on individual aspects of a telecommunication system and number in the hundreds, the complete list of such specifications is not provided here but rather is incorporated by reference and referred to as a group as the 3G standard. Of note for this disclosure are technical specifications TS 25.213 v2.0.0 (1999-4) and ETSI TS 125 213 v6.5.0 (2006-03). The apparatuses and methods disclosed and described here can also be used in conjunction with other versions of the 3G standard, possibly with minor modifications that will be apparent to those having an ordinary level of skill in this area.

Figure 9:
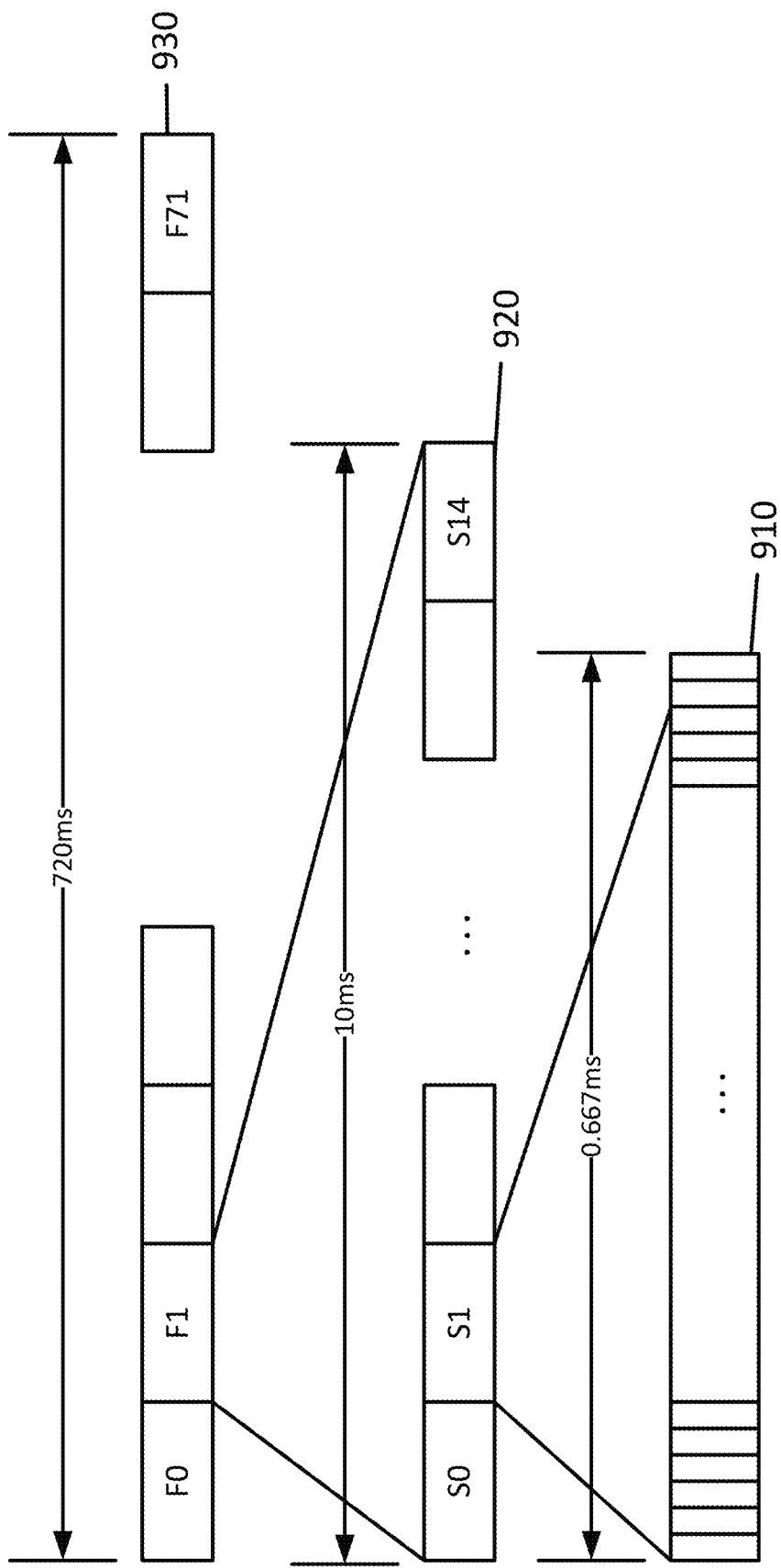
FIG. 9 is a data map that depicts formats of data groups used in wireless electronic communication signals in accordance with the 3G standards.

FIG. 9 is a data map that depicts formats of data groups used in wireless electronic communication signals in accordance with the 3G standards referenced above. A slot 910 can include 2560 chips. A number of bits included in each slot 910 can vary. Each slot 910 can be transmitted over a duration of approximately 0.667 ms. A frame 920 can include 15 slots 910 and can be transmitted over a duration of approximately 10 ms. A superframe 930 can include 72 frames 920 and can be transmitted over a duration of approximately 720 ms.

Each Node B in a wireless electronic communication network operating in accordance with the 3G standard broadcasts the same primary synchronization signal (PSC) in the first 256 chips in a slot 910. The actual code data used as the PSC, Cpsc, is constructed as a generalized hierarchical Golay sequence as follows:

$$a = <x_1, x_2, x_3, \ldots x_{16}> = <1,1,1,1,1,1,-1,-1,1,-1,1,-1,-1,1>$$

The PSC can be generated by repeating the above sequence a modulated by a Golay complementary sequence and creating a complex-valued sequence with identical real and imaginary components.

$$C_{psc} = (1+j) \times <a,a,a,-a,-a,a,-a,-a,a,a,a,-a,a,-a,-a,a>$$

where the leftmost chip in the sequence corresponds to the chip that is first transmitted.

There are 16 secondary synchronization codes (SSCs) denoted as {Cssc,1 . . . Cssc,16}. Each is complex-valued with identical real and imaginary components constructed from position-wise multiplication of a Hadamard sequence and a sequence z.

$$z = <b,b,b,-b,b,b,-b,-b,b,-b,b,-b,-b,-b,-b,-b>$$

where $b = <x_1, x_2, x_3, \ldots x_{16}>$ and $x_1, x_2, x_3, \ldots x_{16}$ are the same as in sequence a. The Hadamard sequences are obtained as rows of a matrix $H_8$ constructed recursively by $$H_0 = (1)$$

$$H_k = \begin{pmatrix} H_{k-1} & H_{k-1} \\ H_{k-1} & -H_{k-1} \end{pmatrix}, k \geq 1$$

Rows are numbered from the top of the matrix beginning with row 0 which consists of a sequence of all 1s.

The n:th Hadamard sequence is a row of H8 numbered from the top, where n=0, 1, 2, . . . , 255, in the sequel. Then $h_n(i)$ and $z(i)$ each refer to the i:th symbol of the sequence $h_n$ and z, respectively where i=0, 1, 2, . . . , 255 and i=0 corresponds to the leftmost symbol. The k:th SSC, $C_{ssc,k}$, k=1, 2, 3, . . . , 16 can be defined as:

$$C_{ssc,k} = (1+j) \times <h_m(0) \times z(0), h_m(1) \times z(1), h_m(2) \times z(2), \ldots, h_m(255) \times z(255)>$$

where m=16×(k−1) and the leftmost chip is the chip that is first transmitted.

There are a total of 16 code sequences that can be used to form 64 different combinations. Each combination can be used for one of 64 groups.

Primary synchronization (P-Sync) and secondary synchronization (S-Sync) signals share the total base station output power with other signals. One possible configuration includes a common pilot channel (CPICH) operating at approximately 10% of total power, for example 20 watts (W) (43 decibels below 1 miliwatt (dBm)). Node B transmits CPICH at approximately 33 dBm. P-Sync can be transmitted at a −1.8 dBm offset, or approximately 31 dBm. S-Sync can be transmitted at a −3.5 dBm offset, for example, at 29.5 dBm.

One of the 64 groupings can be detected from the S-Sync signal. The specific grouping identifier can be used to identify one of 8 possible scrambling codes. The pilot signal is a fixed signal that can be scrambled by a primary scrambling code.

Figure 10:
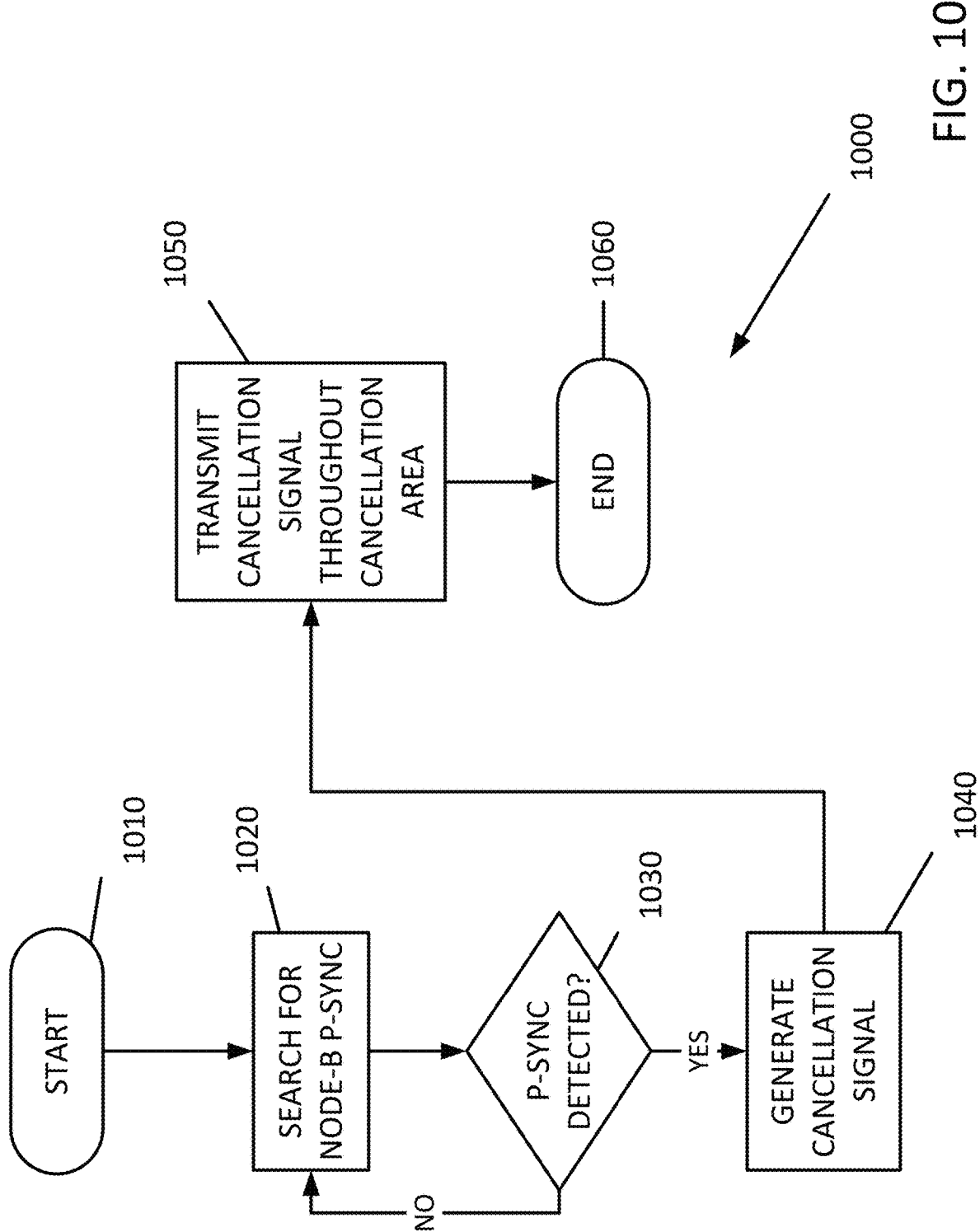
FIG. 10 is a flow diagram that depicts steps in a method that can be used to detect whether a wireless electronic communication network is operating on a 3G standard protocol and generate a cancellation signal for that protocol.

FIG. 10 is a flow diagram that depicts steps in a method 1000 that can be used to detect whether a wireless electronic communication network is operating on a 3G standard protocol and generate a cancellation signal for that protocol. Execution of the method 1000 begins at START block 1010 and continues to process block 1020. At process block 1020 a scanner can attempt to identify a P-Sync signal broadcast from a Node B station is made. Processing continues to decision block 1030 where a determination is made whether a P-Sync signal has been detected. If that determination is NO, processing returns to process block 1020. If the determination is YES, processing continues to process block 1040.

At process block 1040 a cancellation module can generate a cancellation signal. To do so, the complement of vector a, vector a', can be created by filling a vector with the same values of vector a but having the opposite sign. Then vector a' can be used to generate P-Sync' and S-Sync' signals to cancel the P-Sync and S-Sync signals broadcast by Node B. These signals can occupy the entire bandwidth, can last for 256 3G chips, and can be inserted into the starting position of each slot.

Once the cancellation signal is generated at process block 1040, processing continues to process block 1050. At process block 1050, a transmitter receives the cancellation signal from the cancellation module and broadcasts the cancellation signal throughout the cancellation area. Processing terminates at END block 1060.

A third example of a possible implementation of the wireless electronic communication management system 100 is based on a wireless electronic communication network that uses a group of technologies included in the specifications for the LTE cellular communication protocol. Specifically, this example is based on such specifications in existence in 2018 available from 3GPP. Because 3GPP publishes interrelated specifications that each focus on individual aspects of a telecommunication system and number in the hundreds, the complete list of such specifications is not provided here but rather is incorporated by reference and referred to as a group as the LTE standard. Of note for this disclosure are technical specifications in Series 36, Release 15, and specifically including TS 36.211 v15.3.0 (2018-09). The apparatuses and methods disclosed and described here can also be used in conjunction with other versions of the LTE standard, possibly with minor modifications that will be apparent to those having an ordinary level of skill in this area.

Figure 11:
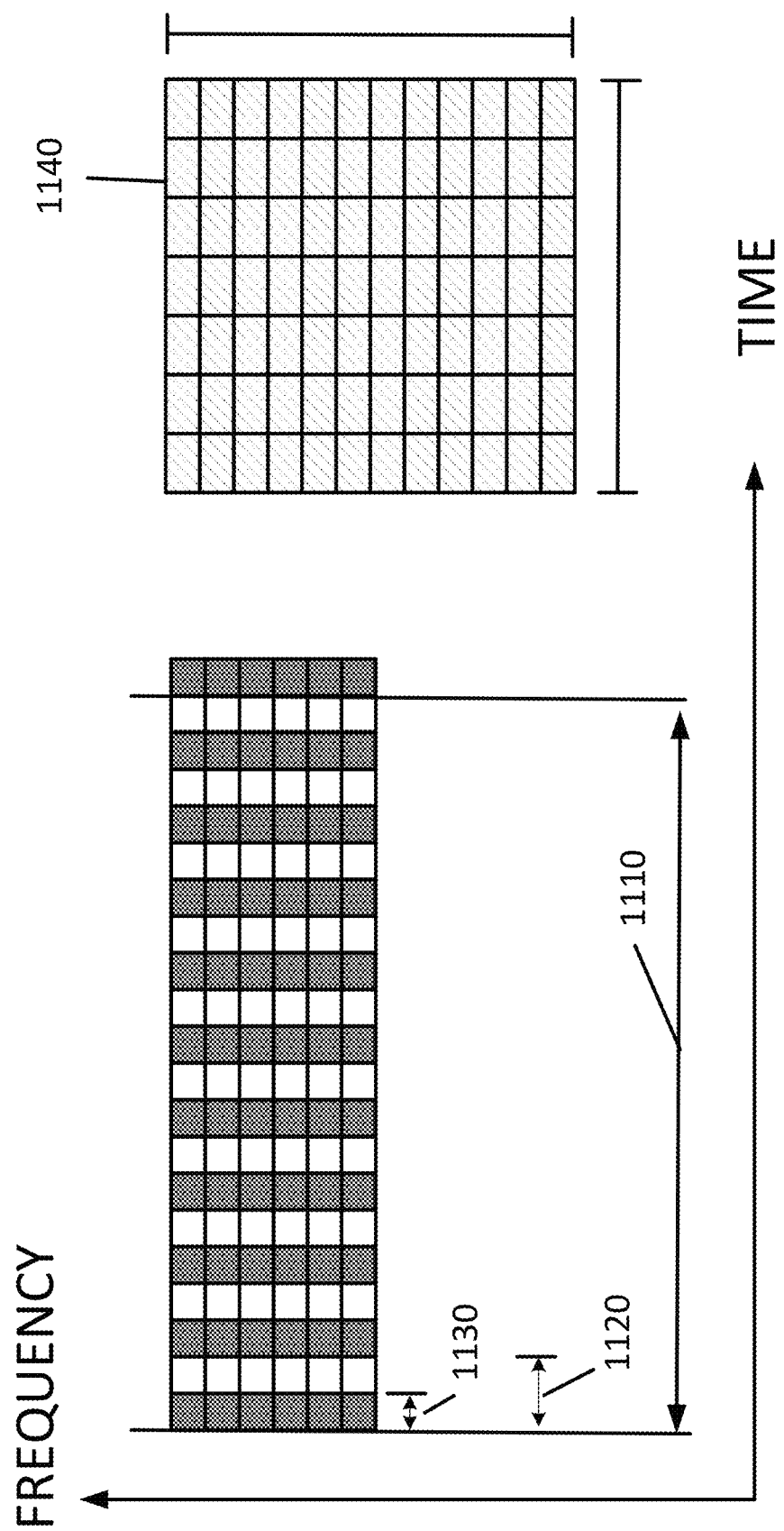
FIG. 11 is a data map of a basic data format that can be used in an LTE system

FIG. 11 is a data map of a basic data format that can be used in an LTE system. The data map is depicted in matrix form to visually depict that LTE communications employ multiple orthogonal radio transmissions. A basic unit is a frame 1110. Each frame 1110 can be transmitted over a duration of 10 ms. Each frame 1110 can include 10 subframes 1120, each of which can be transmitted over a duration of 1 ms. Each subframe 1120 can include 2 slots 1130, each of which can be transmitted over a duration of 0.5 ms. Each slot 1130 can include multiple resource blocks 1140. Each resource block can be 7 symbols wide and have 12 rows, each of which is transmitted by one of 12 subcarrier frequencies and spaced 15 kHz apart from each adjacent subcarrier frequency.

Figure 12A:
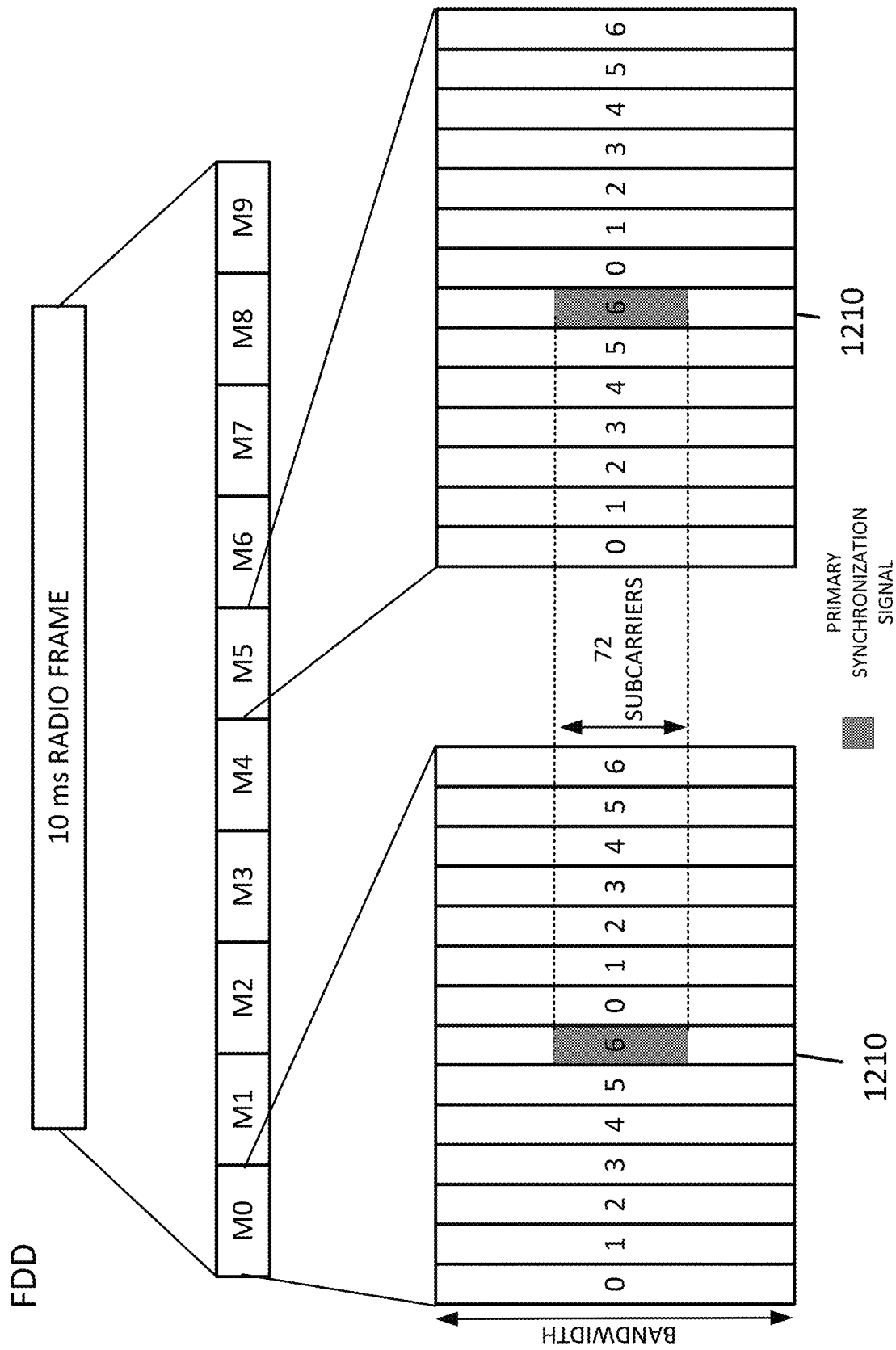
FIG. 12A is a data map depicting a basic data format for frequency division duplex (FDD) LTE frames with a primary synchronization signal.

FIG. 12A is a data map depicting a basic data format for frequency division duplex (FDD) LTE frames. As shown, a primary synchronization signal (PSS) 1210 is located at a central frequency. Locating the PSS in this position means that no frequency bandwidth information is needed. The PSS 1210 can be broadcast twice during each frame and both transmissions can be identical.

Figure 12B:
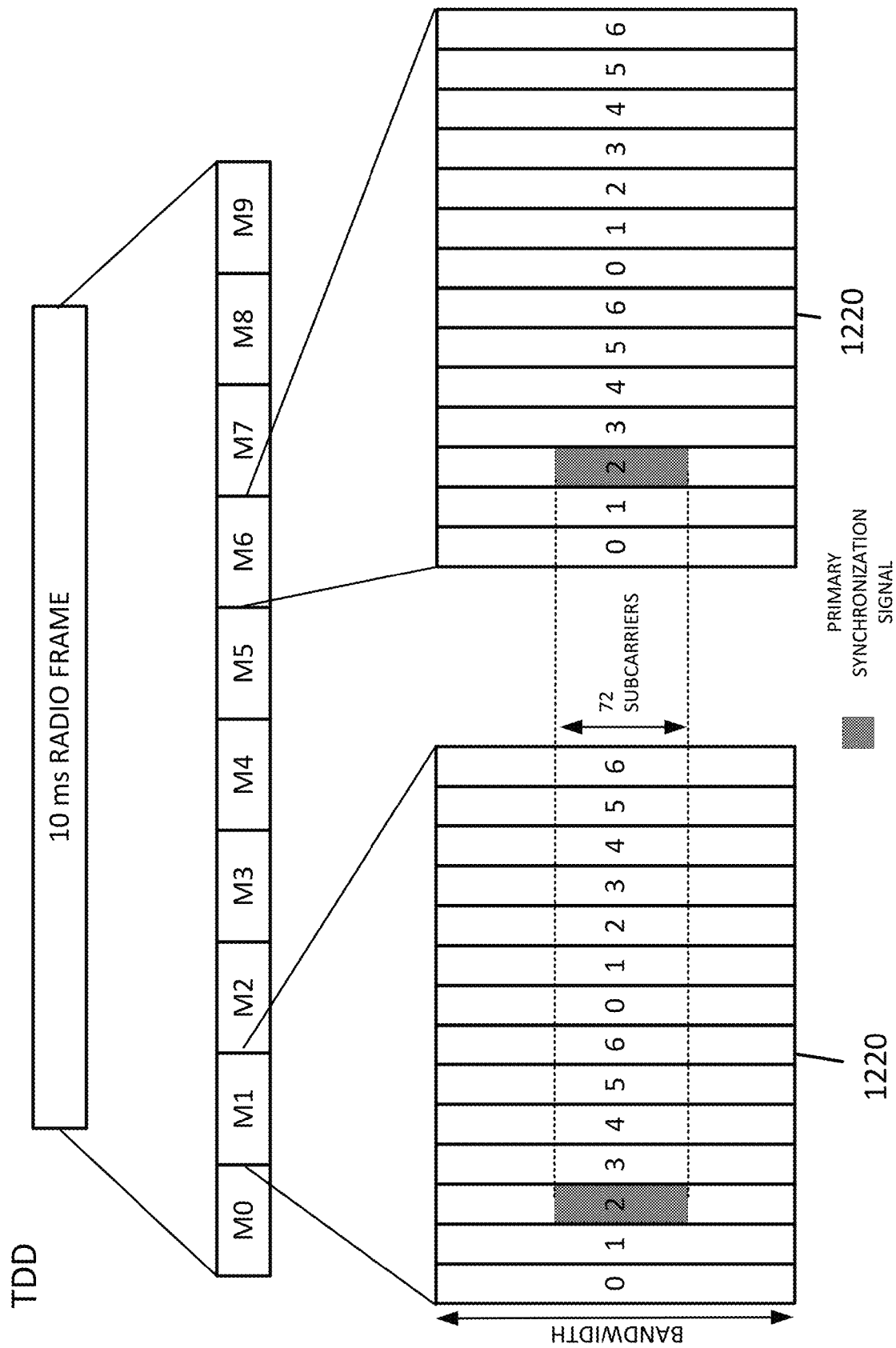
FIG. 12B is a data map depicting a basic data format for time division duplex (TDD) LTE frames with a primary synchronization signal.

FIG. 12B is a data map depicting a basic data format for time division duplex (TDD) LTE frames. As shown, a PSS 1220 is located in position 2 of the first slot of subframes 1 and 6 of the frame. As more fully described in the LTE specification, a Zadoff-Chu root sequence index can be used to detect the PSS 1220 and determine a cell identifier and network identifier (NID).

Figure 12C:
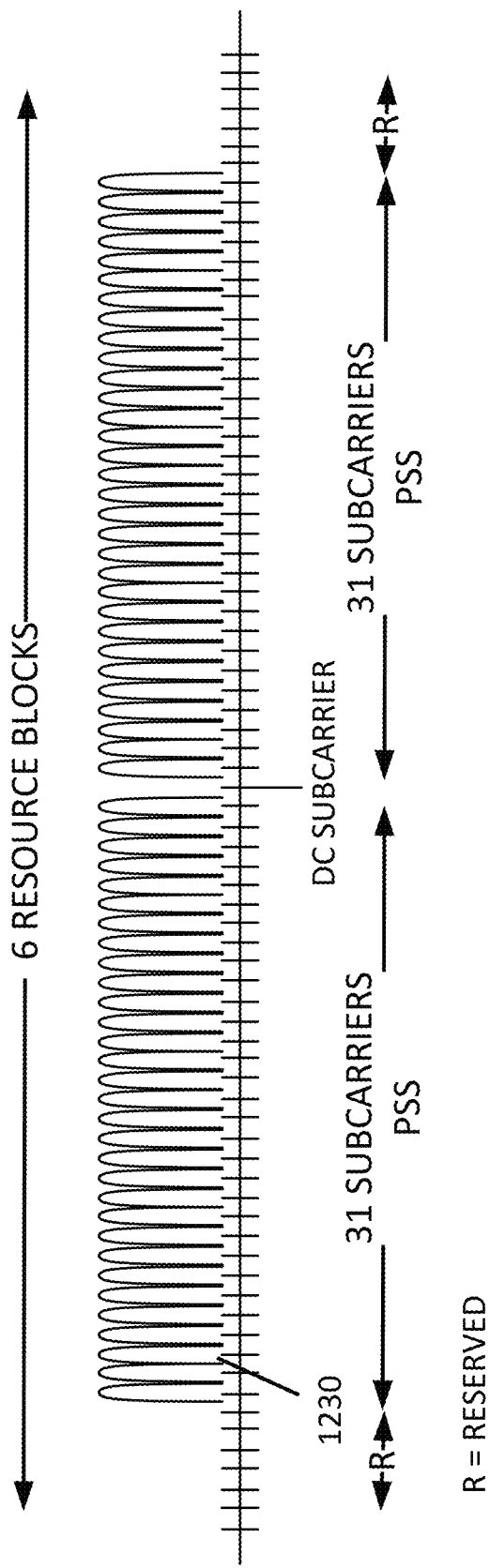
FIG. 12C is a block diagram of subcarriers.

As depicted in FIG. 12C, a PSS 1230 can be carried in 6 resource blocks by 62 subcarriers in 2 groups of 31 subcarriers each. Specifically, the PSS 1230 can be broadcast using the central 62 subcarriers belonging to the third symbol of the second time slot of the first subframe and the third symbol of the twelfth time slot of the sixth subframe.

Figure 13A:
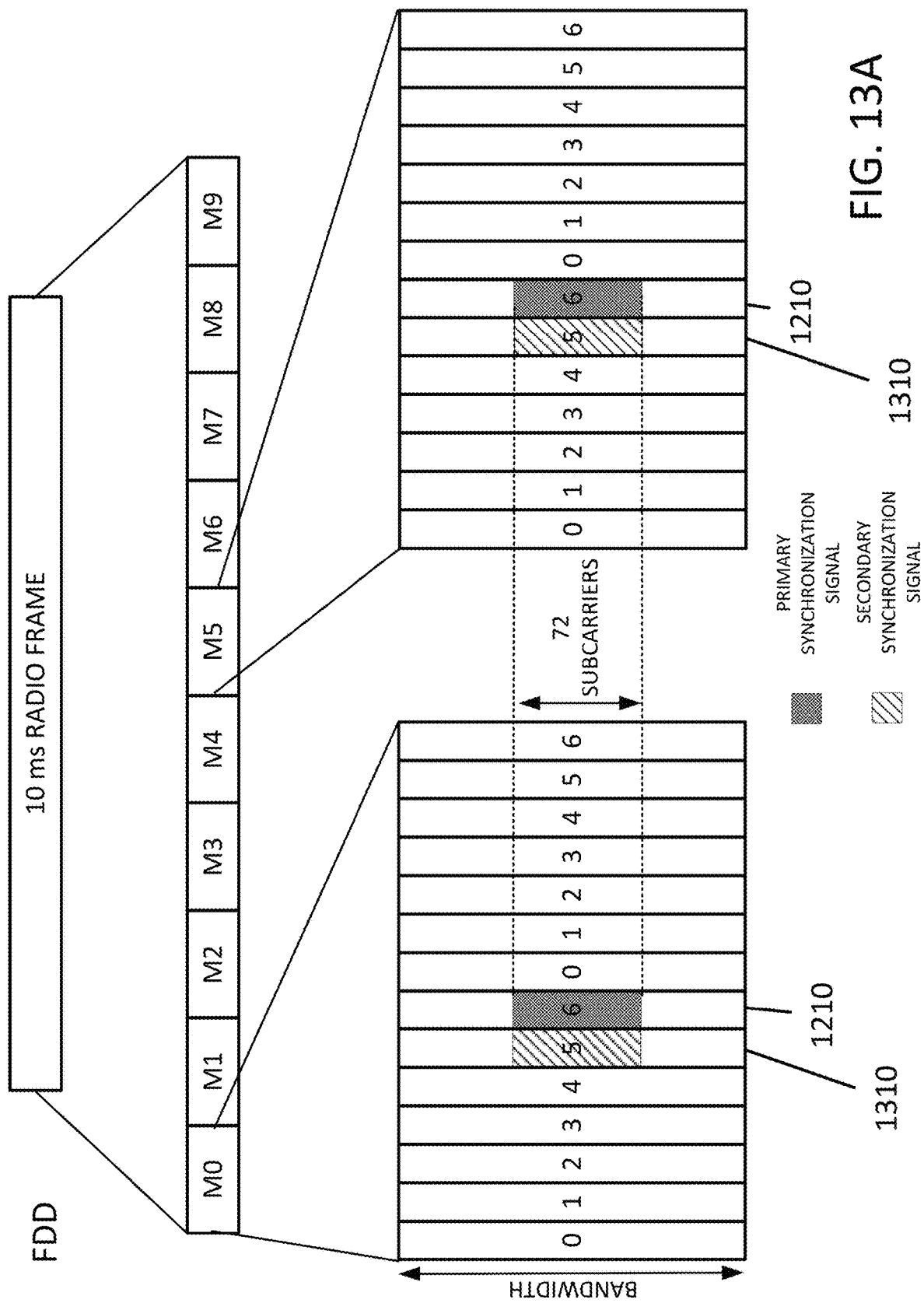
FIGS. 13A and 13B are data maps that depict a secondary synchronization signal (SSS).
Figure 13B:
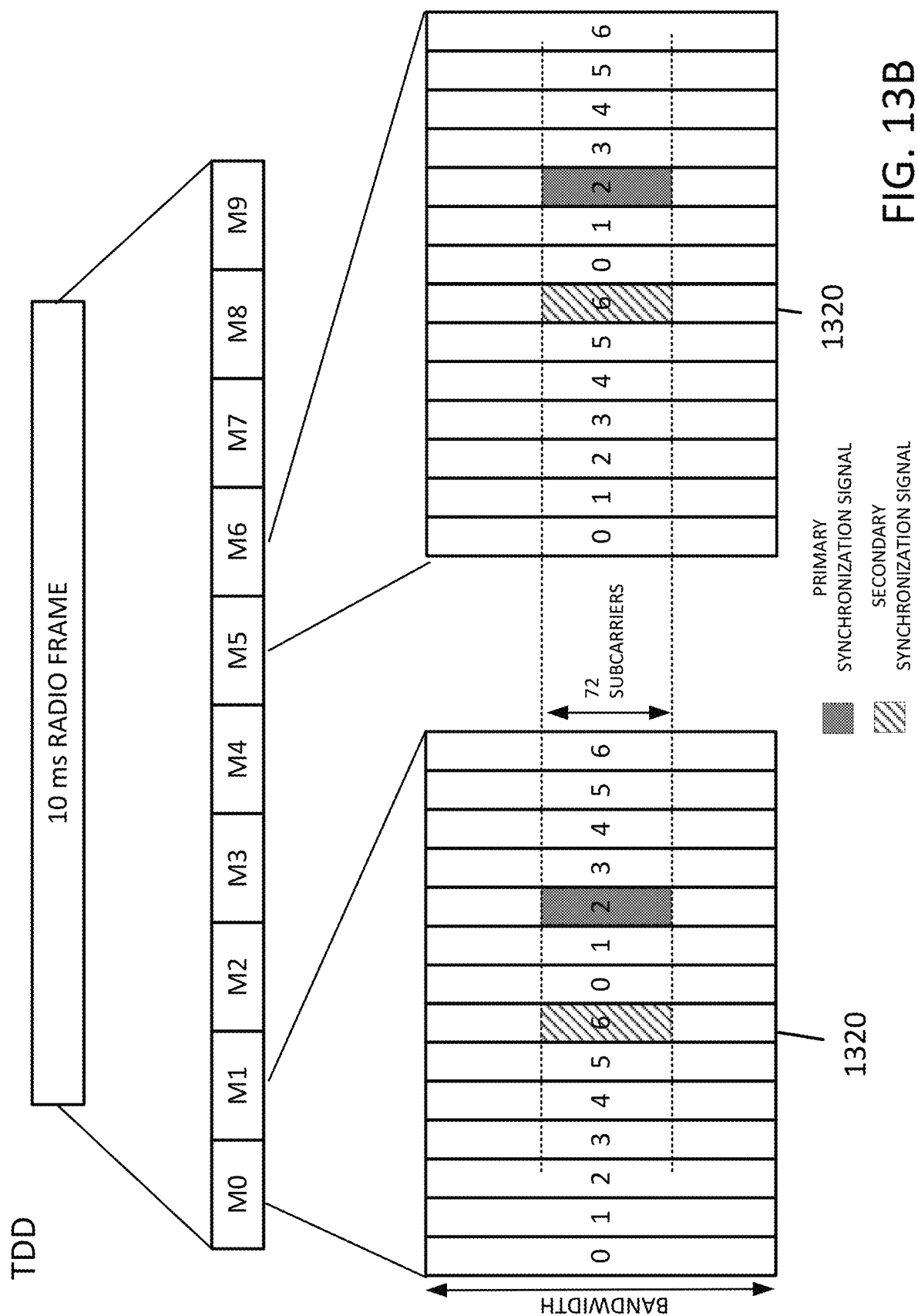

FIGS. 13A and 13B are data maps that correspond to the data maps of FIGS. 12A and 12B, respectively, but depict a secondary synchronization signal (SSS). The SSS can be one of 168 codes represented by a 62 bit sequence and can be broadcast twice within each frame. The SSS helps to synchronize radio frames and permits identification of the cell identifier NID. The two transmissions are different so that the first and second transmissions can be identified.

For the FDD format depicted in FIG. 13A, an SSS 1310 is located at a central frequency one slot before the PSS 1210 that is also depicted in FIG. 12A. Specifically, the SSS can be broadcast using the central 62 subcarriers of the second to last symbol of time slots 0 and 10. For the TDD format shown in FIG. 13B, an SSS can be broadcast using the central 62 subcarriers of the last symbol of time slot 1 of subframe 0 and the last symbol of time slot 11 of subframe 5.

Figure 14:
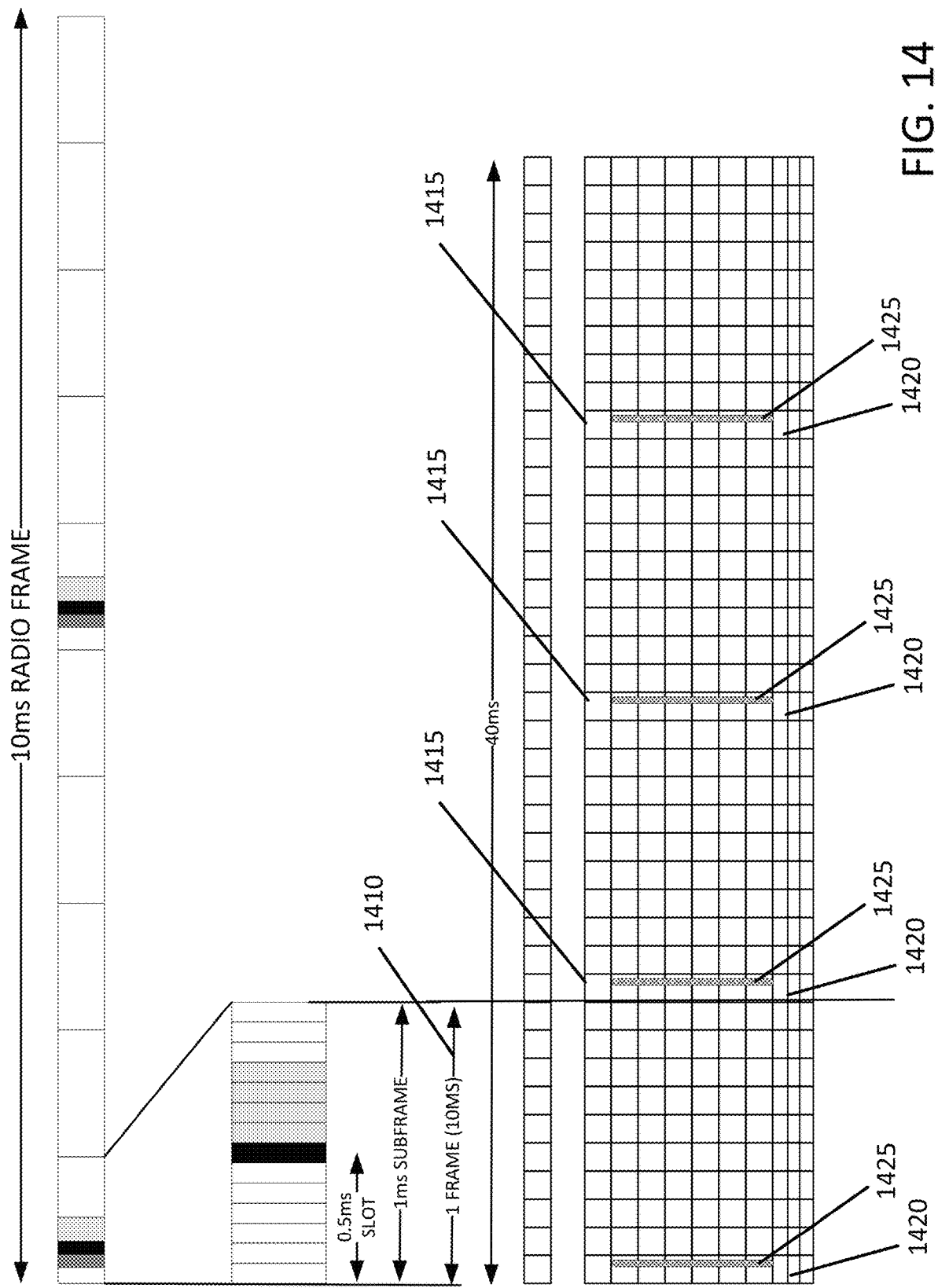
FIG. 14 is a data map of a data transmission that can be used in LTE communications.

FIG. 14 is a data map that depicts frames 1410 and subframes 1415 of a data transmission that can be used in LTE communications. An MIB 1420 can be located by an MS after obtaining the cell identifier NID. The 0th subframe includes the MIB 1420. The MIB 1420 can include information regarding a physical broadcast channel (PBCH) and a system frame number. Specifically, 3 bits can be used to describe system bandwidth, 3 bits can be used to identify the physical hybrid automatic repeat request (HARQ) indicator channel (PHICH), and 8 bits can be used to identify the system frame number. The same MIB 1410 can be repeated 4 times for data redundancy.

Figure 15:
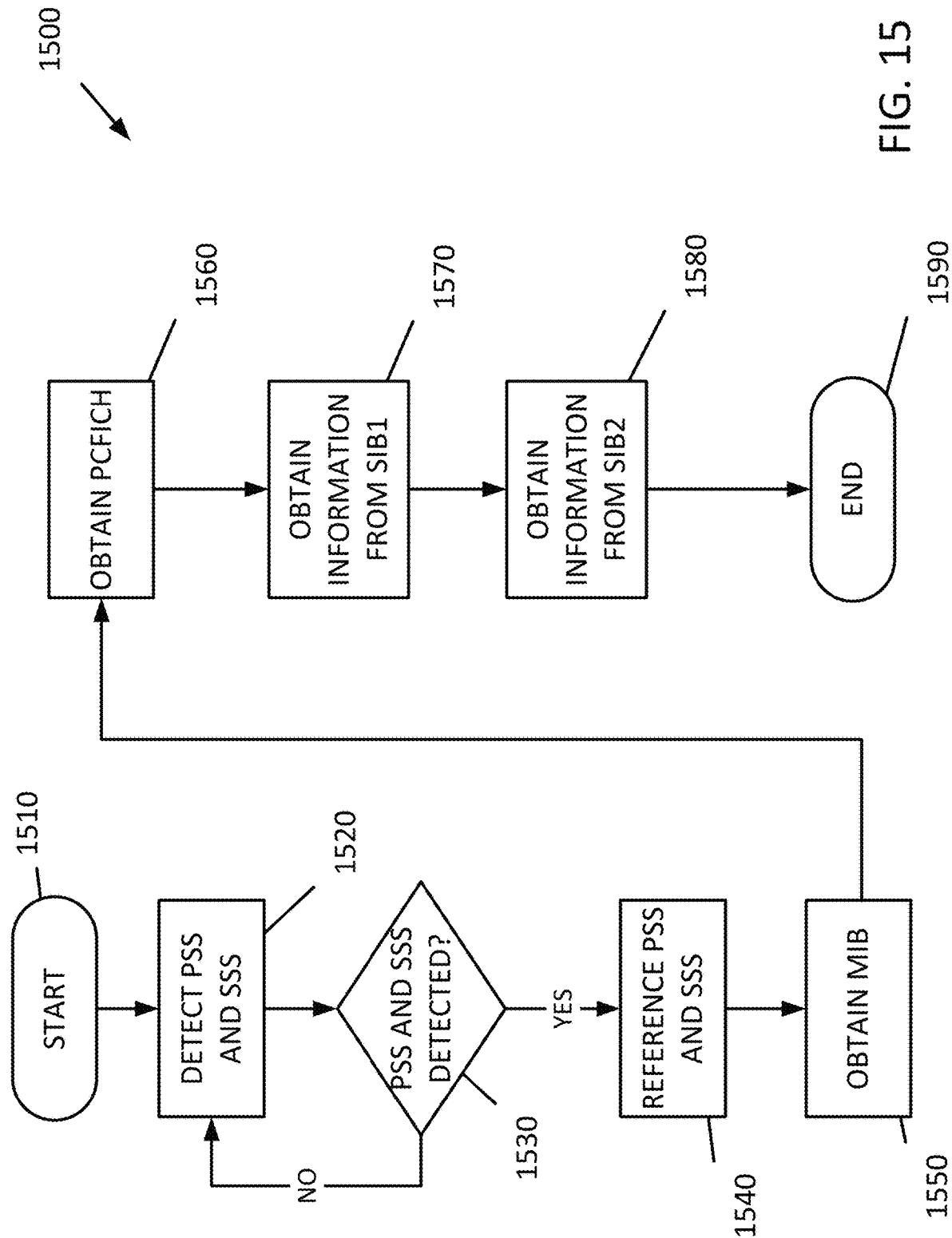
FIG. 15 is a flow diagram depicting steps in a method that can be used to detect the presence of an LTE wireless electronic communication network.

FIG. 15 is a flow diagram depicting steps in a method 1500 that can be used to detect the presence of a wireless electronic communication network operating in accordance with the LTE specification. Execution of the method 1500 begins at START block 1510 and proceeds to process block 1520. At process block 1520 a scanner, such as the scanner 200 described in conjunction with FIG. 2, attempts to detect whether a wireless electronic signal received by a receiver, such as the receiver 210 of FIG. 2, includes a PSS or SSS.

Execution of the method 1500 continues at decision block 1530 where a determination is made whether the wireless electronic signal includes a PSS or SSS. If that determination is NO, processing returns to process block 1520. If the determination is YES, processing continues to process block 1540.

At process block 1540 the scanner references the detected PSS and SSS. At process block 1550, the scanner obtains the MIB. Processing continues to process block 1560 where the scanner obtains the PCFICH. At process block 1570, the scanner obtains the information carried by SIB1. The scanner obtains information from SIB2 at process block 1580. Processing terminates at END block 1590. Notably, blocks 1570 and 1580 are optional and may be omitted in some embodiments.

Figure 16:
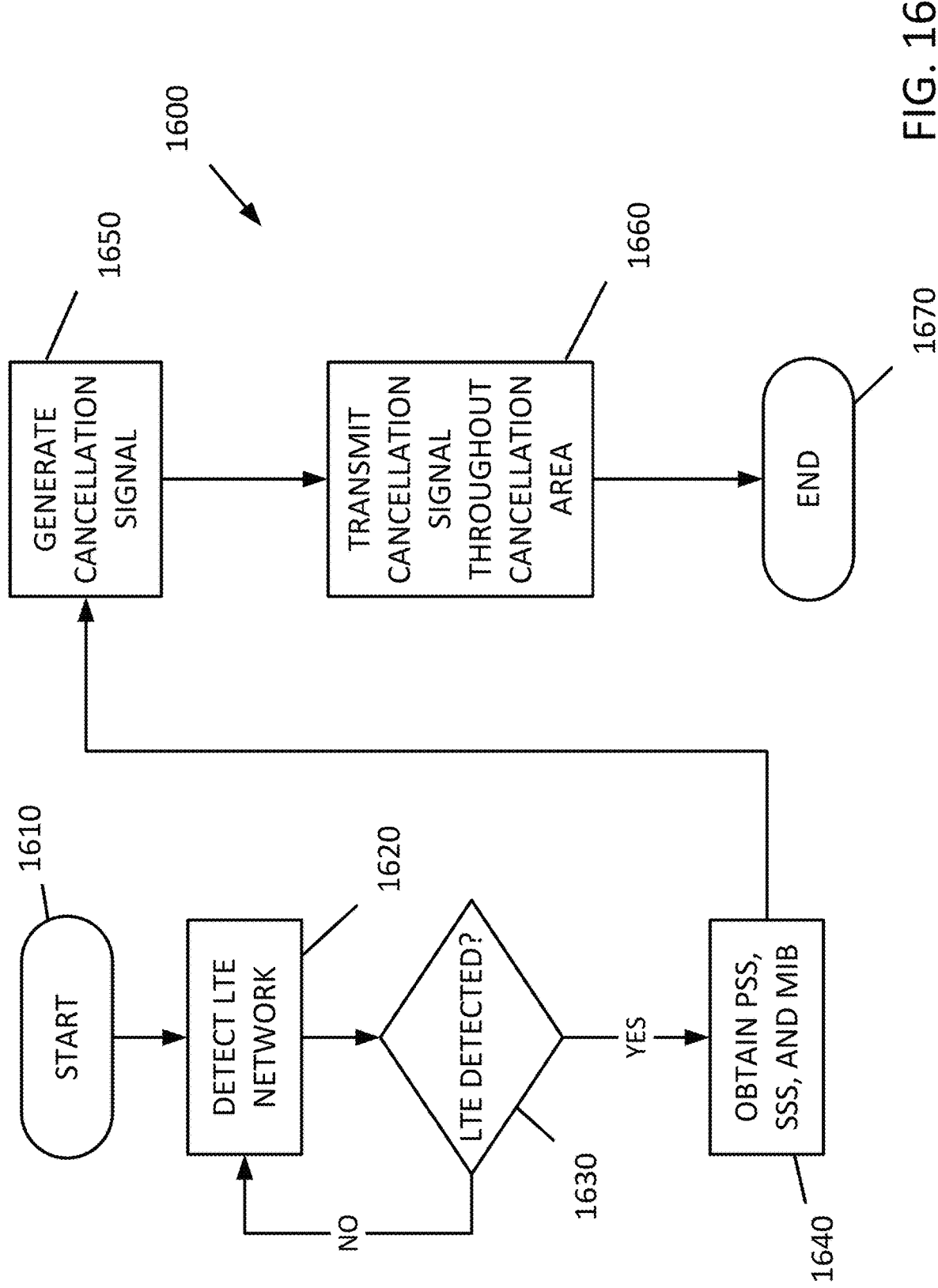
FIG. 16 is a flow diagram depicting steps in a method that can be used to generate a cancellation signal for an LTE wireless electronic communication network.

FIG. 16 is a flow diagram depicting steps in a method 1600 that can be used to generate a cancellation signal to prevent mobile stations from joining a wireless electronic communication network operating in accordance with the LTE standard. Execution of the method 1600 begins at START block 1610 and continues to process block 1620. A scanner, such as the scanner 200 described in conjunction with FIG. 2, attempts to detect whether a wireless electronic signal received by a receiver, such as the receiver 210 of FIG. 2, indicates the presence of a wireless electronic communication network operating in accordance with the LTE standard.

Execution of the method 1600 continues at decision block 1630 where a determination is made whether an LTE network is present. If that determination is NO, processing returns to process block 1620. If the determination is YES, processing continues to process block 1640.

At process block 1640 the scanner obtains the PSS, the SSS, and the MIB. The scanner uses information from the PSS, SSS, and MIB to determine whether the LTE network is TDD or FDD, the start position of a frame, the root sequence, and the cell identification group.

Processing continues to process block 1650 where a cancellation module, such as the cancellation module 330 described in conjunction with FIG. 3, generates a cancellation signal, based at least in part upon one or more of the central frequency of the LTE network, whether the network is TDD or FDD, the frame start position, the root sequence, the cell identification group, other network information from the MIB or one of the SIBs, P-Sync, S-Sync, and MIB signal strength. Several techniques can be employed to generate the cancellation signal.

A possible technique involves generating a nullification signal as the cancellation signal that is based on the PSS, the SSS, the MIB, or a combination of some or all of these, by phase shifting each of the symbols in the PSS, the SSS, the MIB, or the combination of some or all of these by one hundred eighty degrees.

The cancellation module can send the generated cancellation signal to a transmitter, such as the transmitter 340 described in conjunction with FIG. 3. Processing can continue to process block 1660 where the transmitter can broadcast the cancellation signal throughout a cancellation area within the range of the transmitter. Processing of the method 1700 terminates at END block 1670.

Figure 17:
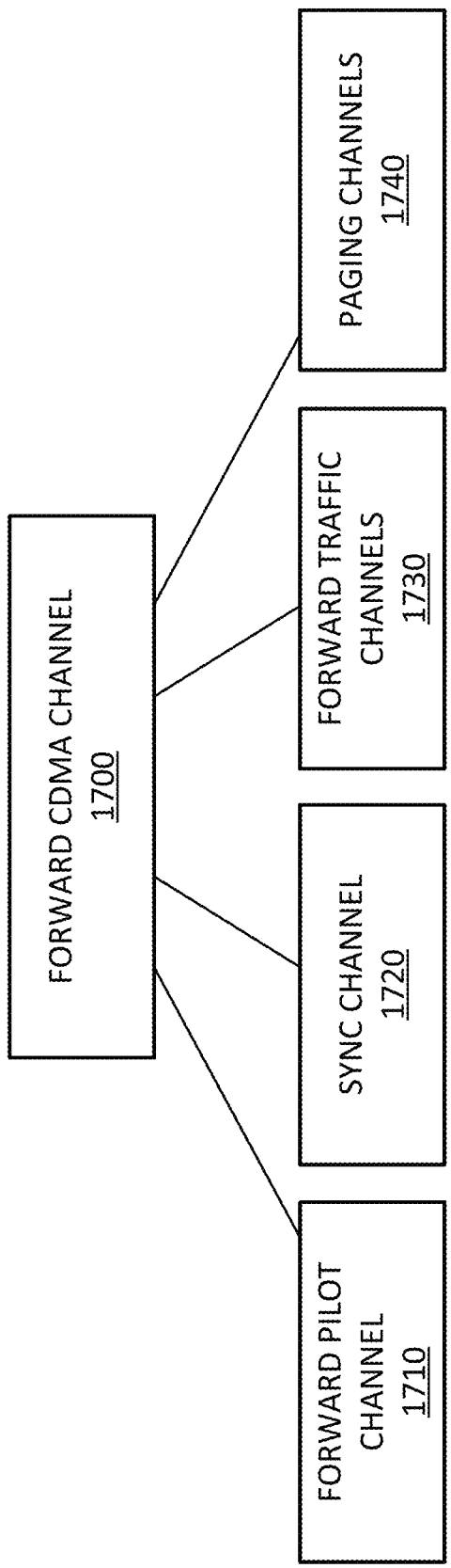
FIG. 17 is a block diagram of a data format that can be employed for wireless electronic communications.

FIG. 17 is a logical block diagram of a forward (base station to mobile wireless device) channel that can be employed for wireless electronic communications in accordance with CDMA wireless electronic communication protocol standards in existence at the time of filing. In the example shown in this figure, forward CDMA channel 1700 includes four sub-channels: forward pilot channel 1710, sync channel 1720, forward traffic channels 1730, and paging channels 1740. In various embodiments, more or fewer channels or different arrangements of channels may be used.

Forward pilot channel 1710 is a reference channel that mobile wireless devices use for acquisition and timing, and as a phase reference for coherent demodulation. It is transmitted at all times by each base station on each active CDMA frequency. Sync channel 1720 may provide a repeating message that conveys the timing and system configuration information to mobile wireless devices. Forward traffic channels 1730 are used to assign voice and data capacity (as well as signaling traffic in some cases) to individual mobile wireless devices. Paging channel 1740 may transmit pages (notifications of incoming calls or incoming data) to mobile wireless devices. In some cases, the base station may use pages to provide system overhead information and recipient-specific messages.

Notably, a mobile wireless electronic communication device, such as the mobile communication device 110 shown in FIG. 1 or a scanner such as the scanner 200 shown in FIG. 2, can receive transmissions of the pilot signals from forward pilot channel 1710 and determine that a CDMA network is present from the duration and timing of the broadcasts of these pilot signals.

Figure 18:
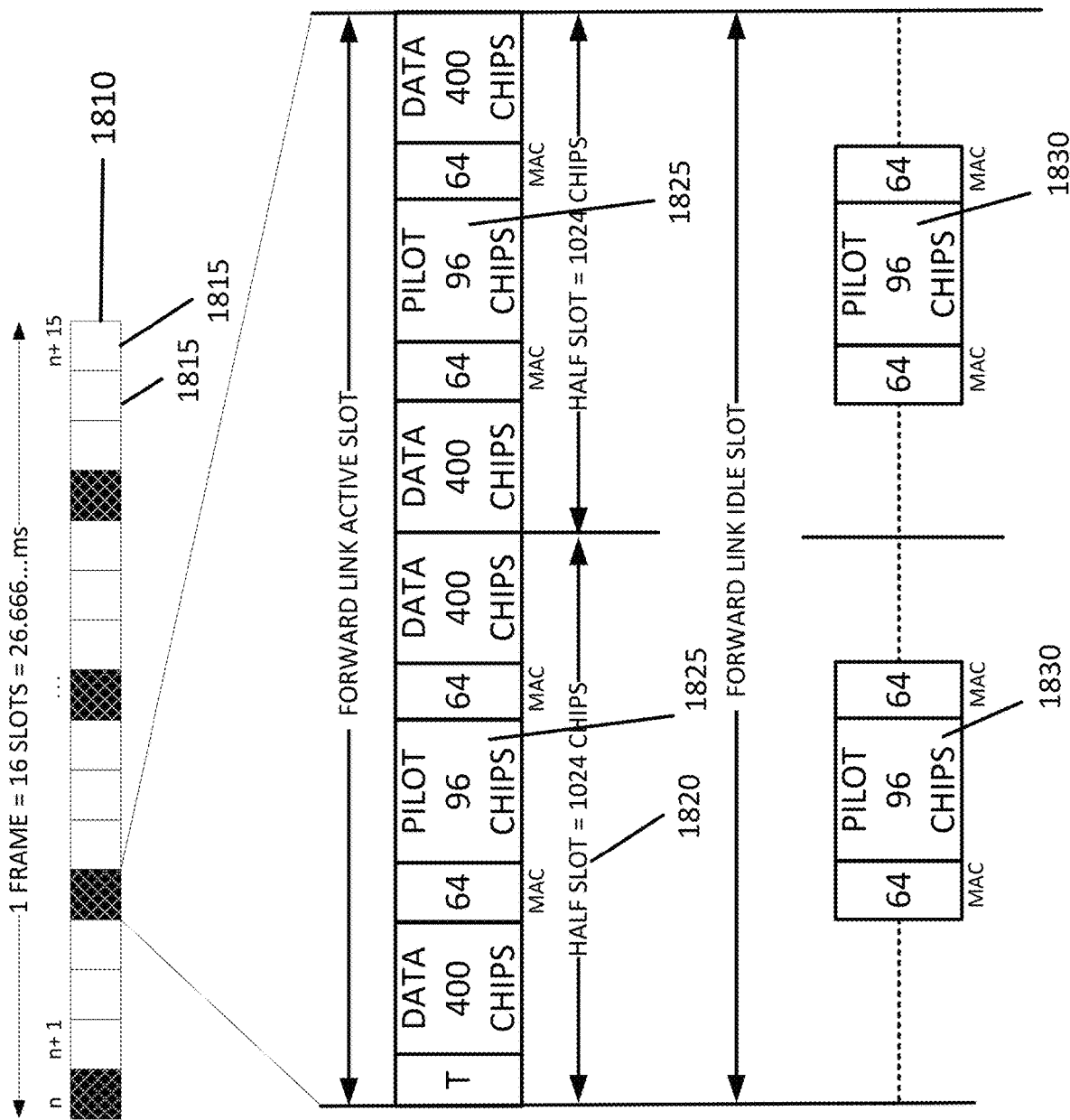
FIG. 18 is a block diagram of a data format that can be employed for EVDO wireless electronic communications.

FIG. 18 is a block diagram of a data format that can be employed for wireless electronic communications in accordance with CDMA-EVDO in existence at the time of filing. In the example shown in this figure, a frame 1810, which can be used as a basic 1×EV-DO frame, is shown with 16 slots 1815. The frame 1810 can be transmitted over a duration of approximately 26.667 ms. Each slot 1815 can include 2048 chips and can be transmitted over a duration of approximately 1.667 ms.

Each slot of the frame 1810 can include 2 half slots 1820 of 1024 chips. A pilot signal 1825 of 96 chips, bounded on each side by 64 MAC chips, can be included in a central position between two sets of 400 data chips in each half slot for an active forward link slot. For an idle forward link slot, a pilot signal 1830 of 96 chips can be bounded on each side by 64 MAC chips in the approximate center of idle positions.

Figure 19:
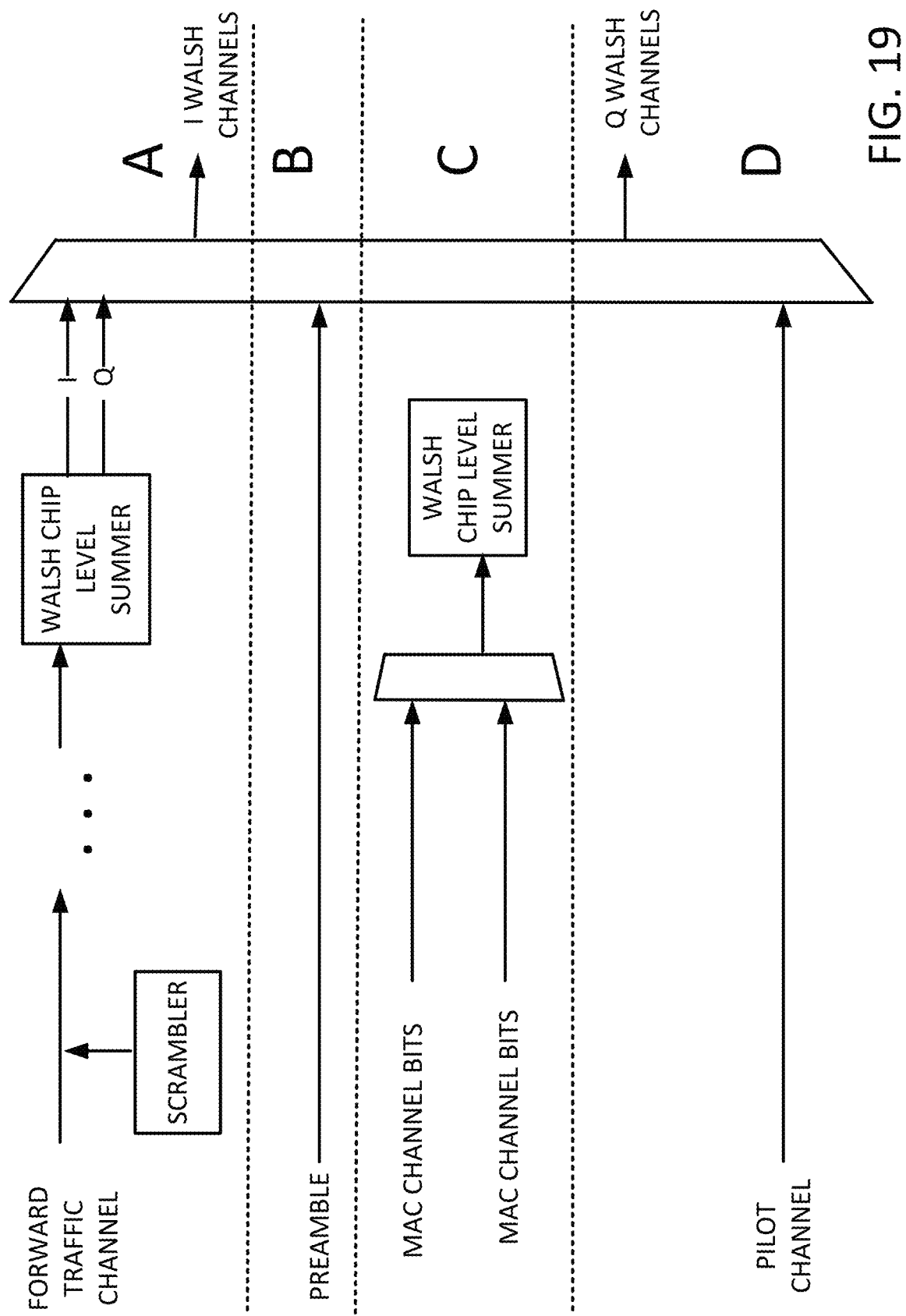
FIG. 19 is a simplified system block diagram that depicts EVDO forward channels.

FIG. 19 is a simplified system block diagram that depicts EVDO forward channels. The diagram is separated into four regions A, B, C, and D to separate types of forward channels depicted. In region A, the components shown depict a forward traffic channel or control channel physical layer packets converted to be sent as a Walsh code. Region B depicts the same for a preamble containing all logical 0s. Region C shows MAC channel bits or symbols converted to be sent as a Walsh code. Region D shows the same for a pilot channel containing all logical 0 values.

Figure 20:
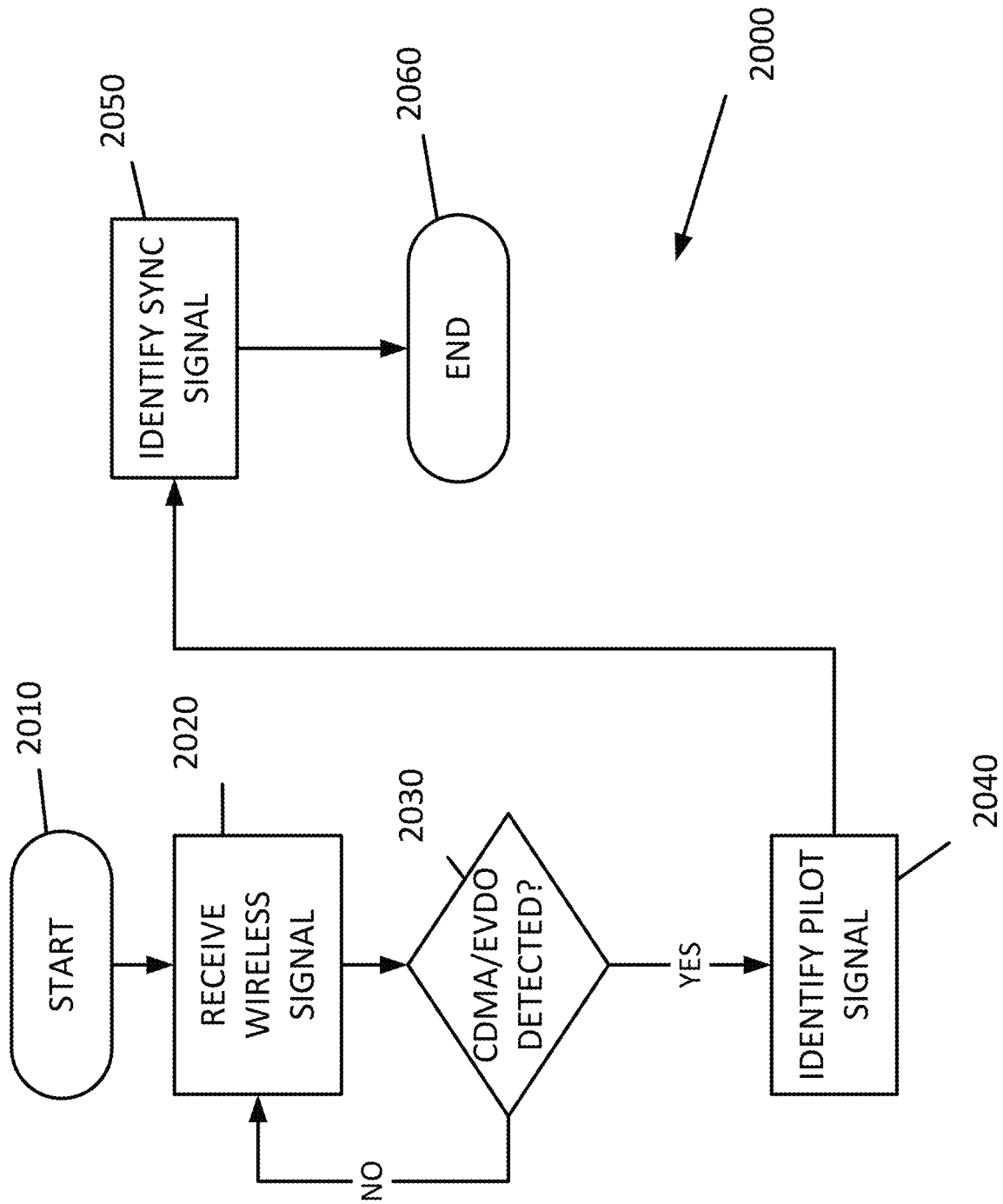
FIG. 20 is a flow diagram depicting steps in a method that can be used to detect an existing CDMA/EVDO network.

FIG. 20 is a flow diagram depicting steps in a method 2000 that can be used to detect whether a wireless electronic communication network operating in accordance with the CDMA/EVDO standards. Execution of the method 2000 begins at START block 2010 and continues to process block 2020. At process block 2020 a scanner, such as the scanner 200 described in conjunction with FIG. 2, can receive a wireless electronic communication signal. Processing continues to decision block 2030 where a determination is made whether the received wireless electronic communication signal indicates the presence of a wireless electronic communication network operating in accordance with the CDMA/EVDO standards. If that determination is NO, processing returns to process block 2020. If the determination is YES, processing continues to process block 2040.

At process block 2040 the scanner can identify the pilot signal in a CDMA/EVDO transmission. Processing continues to process block 2050 so the scanner can identify a synchronization signal. Processing of the method 2000 terminates at END block 2060.

Figure 21:
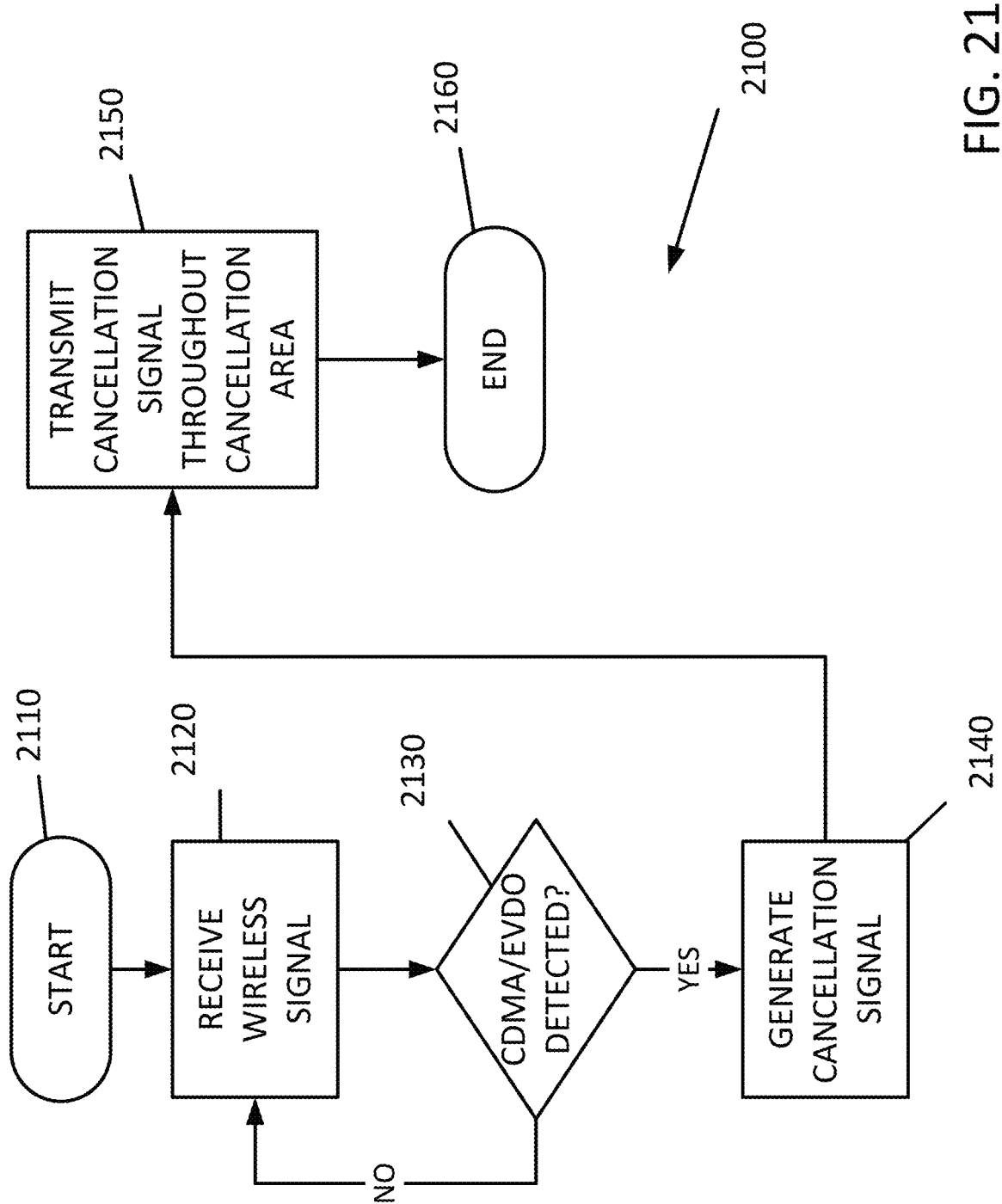
FIG. 21 is a flow diagram depicting steps in a method that can be used to generate a cancellation signal.

FIG. 21 is a flow diagram depicting steps in a method 2100 that can be used to generate a cancellation signal that can be used to prevent mobile stations from joining a wireless electronic communication network operating in accordance with the CDMA/EVDO standards. Processing of the method 2100 begins at START block 2110 and continues to process block 2120. At process block 2120 a scanner, such as the scanner 200 described in conjunction with FIG. 2, can receive a wireless electronic signal. Processing continues to decision block 2130 where a determination is made whether a wireless electronic communication network operating in accordance with the CDMA/EVDO standards is present. If that determination is NO, processing returns to process block 2120. If the determination is YES, processing continues to process block 2140.

At process block 2140 a cancellation module, such as the cancellation module 330 described in conjunction with FIG. 3, generates a cancellation signal. In this example, a nullification signal can be created for use as the cancellation signal by phase shifting each of the pilot and synchronization symbols for CDMA by one hundred eighty degrees. Equivalently, a cancellation signal that includes all logical 1 values can be spread by Walsh code and PN value for EVDO.

Figure 22:
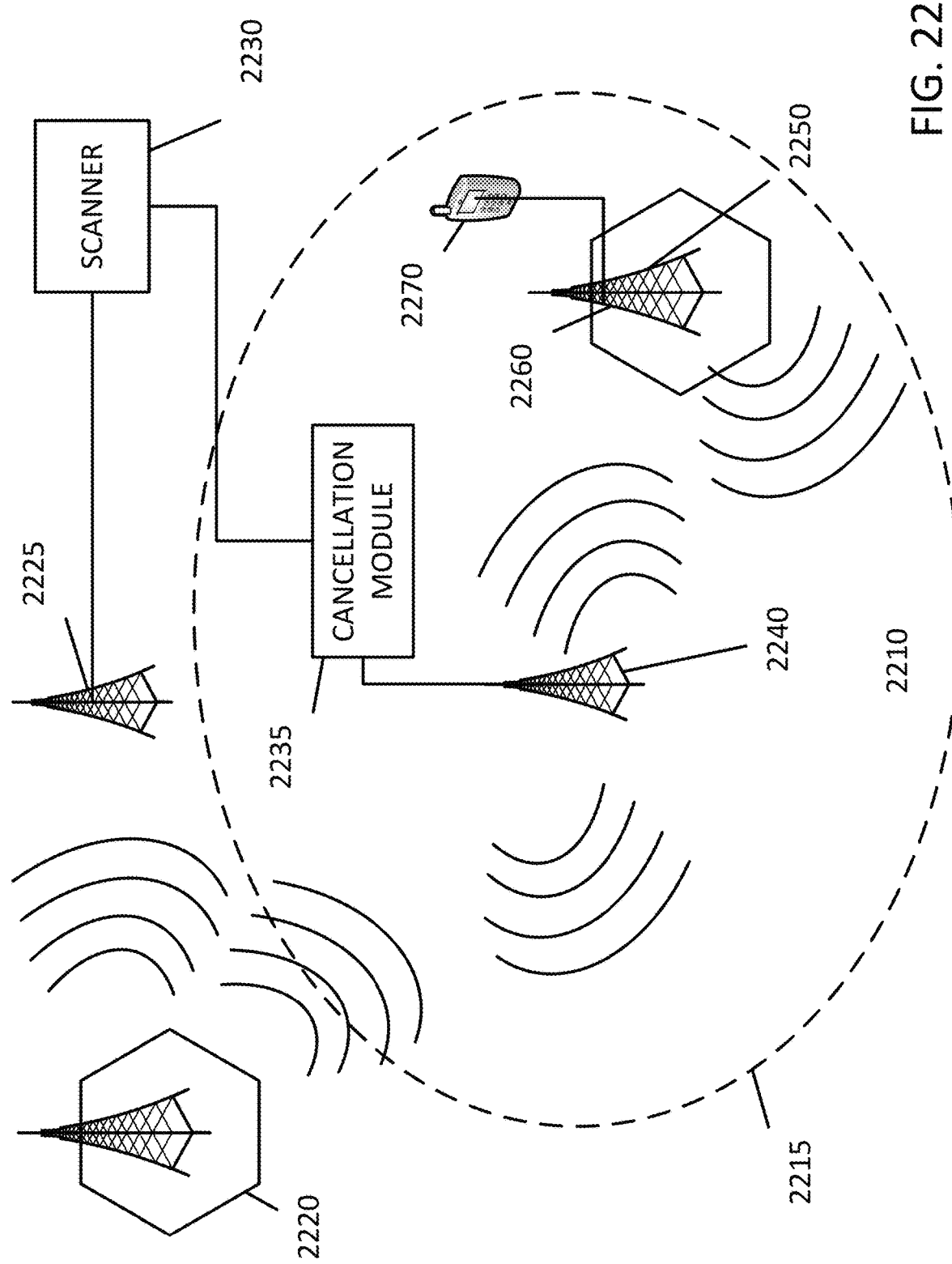
FIG. 22 is a system block diagram of a cancellation zone that includes a private wireless electronic communication network.

FIG. 22 is a system block diagram of a cancellation zone that includes a private wireless electronic communication network. The cancellation zone 2210 can be a region within which a wireless electronic communication management system, such as the wireless electronic communication management system 100 described in conjunction with FIG. 1, is employed to prevent access to one or more available wireless electronic communication networks. The region is depicted by boundary line 2215.

A cellular telephone network access point 2220 can transmit wireless electronic communication signals into the cancellation zone 2210. A receiver 2225 and scanner 2230 of a wireless electronic communication management system reside outside the cancellation zone. A cancellation module 2235 is depicted as optionally placed inside the cancellation zone 2210 along with a transmitter 2240. The transmitter 2240 can broadcast a cancellation signal to create the cancellation zone 2210.

A private wireless electronic communication network 2250, including a transmitter 2260, can be placed within the cancellation zone to provide communication access to a mobile station 2270. The private wireless electronic communication network 2250 can be configured to operate using a protocol or variant of one of the protocols previously discussed that is not being cancelled within the cancellation zone 2210. In this manner, the mobile station 2270 can be caused to join the private wireless electronic communication network 2250 instead of attempting to access the cellular telephone network access point 2220.

This disclosure is not to be limited in terms of the particular embodiments described here, which are intended as illustrations of various possible implementations. Many modifications and variations can be made without departing from its scope, as will be apparent to those skilled in this area. Functionally equivalent methods and apparatuses within the scope of this disclosure, in addition to those described here, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example implementations described here and in the figures are not meant to be limiting. Other implementations can be used, and other changes can be made, without departing from the scope of the subject matter presented here. It will be readily understood that the individual components of the present disclosure, as generally described above and illustrated in the figures, can be arranged, substituted, combined, separated, and designed in a wide variety of different configurations.

With respect to any or all of the message flow diagrams, scenarios, and flow charts in the figures and as discussed above, each step, block, or communication can represent a processing of information or a transmission of information in accordance with examples described. Alternatives are included within the scope of these example embodiments. In these alternatives, for example, operations described as steps, blocks, transmissions, communications, requests, responses, or messages can be executed out of order from that shown or discussed, including substantially concurrently or in reverse order, depending on the functionality involved. Further, more or fewer blocks or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. An apparatus for managing wireless electronic communication signals, comprising:
   a signal monitor configured to detect a transmitted wireless electronic communication signal with an original phase and a frequency within a range of frequencies;
   a signal analyzer configured to identify a communication protocol associated with the transmitted wireless electronic communication signal;
   a cancellation module configured to generate a cancellation signal;
   a transmitter configured to transmit the cancellation signal throughout a cancellation area;

a clock generator configured to permit the signal analyzer to determine a start time for a message formatted in accordance with the communication protocol; wherein the communication protocol is one of GSM, a third generation (3G) protocol, Long Term Evolution (LTE), code-division multiple access (CDMA) 1x, or CDMA evolution data-only (EVDO); and wherein the cancellation signal is formatted to oppose at least some information that was both carried by the transmitted wireless electronic communication signal and formatted in accordance with the communication protocol, wherein the cancellation signal includes a logical value of −1 for each logical value of 1 in the transmitted wireless electronic communication signal and a logical value of 1 for each logical value of −1 in the transmitted wireless electronic communication signal.

2. The apparatus for managing wireless electronic communication signals of claim 1, wherein the communication protocol is GSM.

3. The apparatus for managing wireless electronic communication signals of claim 2, wherein the cancellation signal includes a generated logical zero value in slot 0 of at least one of frames 10, 20, 30, and 40.

4. The apparatus for managing wireless electronic communication signals of claim 1, wherein the communication protocol is a 3G protocol.

5. The apparatus for managing wireless electronic communication signals of claim 1, wherein the communication protocol is LTE.

6. The apparatus for managing wireless electronic communication signals of claim 5, wherein the cancellation signal includes at least one of a P-Sync, S-Sync, and MIB symbol phase-shifted by one hundred eighty degrees.

7. The apparatus for managing wireless electronic communication signals of claim 1, wherein the communication protocol is CDMA 1x.

8. The apparatus for managing wireless electronic communication signals of claim 7, wherein the cancellation signal includes at least one of a pilot signal and a sync signal phase-shifted by one hundred eighty degrees.

9. The apparatus for managing wireless electronic communication signals of claim 8, wherein the cancellation module is configured to align the cancellation signal at a start of at least one frame and at least one superframe.

10. The apparatus for managing wireless electronic communication signals of claim 1, wherein the communication protocol is CDMA evolution data-only (EVDO).

11. The apparatus for managing wireless electronic communication signals of claim 10, wherein the cancellation signal includes a pilot signal that includes a logical 1 value in each position.

12. The apparatus for managing wireless electronic communication signals of claim 10, wherein the cancellation module is configured to insert the cancellation signal into a pilot signal position of at least one frame.

13. The apparatus of claim 1, further comprising a signal combiner configured to combine at least one cancellation signal from each of at least two communication protocols into a combined cancellation signal and to send the combined cancellation signal to the transmitter.

14. The apparatus of claim 13, further comprising a private wireless communication network configured to operate in accordance with a wireless communication protocol.

15. A method for managing wireless electronic communication signals, comprising the steps of:

monitoring a range of frequencies to detect a transmitted wireless electronic communication signal with an original phase and frequency;

analyzing the transmitted wireless electronic communication signal as detected to identify a communication protocol, wherein the communication protocol is one of GSM, a third generation (3G) protocol, Long Term Evolution (LTE), code-division multiple access (CDMA) 1x, or CDMA evolution data-only (EVDO);

determining a start time for a message formatted in accordance with the communication protocol;

generating a cancellation signal based at least in part upon the communication protocol that was identified by phase-shifting at least part of the transmitted wireless electronic communication signal by one hundred eighty degrees from the original phase, wherein the cancellation signal includes a logical value of −1 for each logical value of 1 in the transmitted wireless electronic communication signal and a logical value of 1 for each logical value of −1 in the transmitted wireless electronic communication signal; and transmitting the cancellation signal throughout a cancellation area.

16. The method for managing wireless electronic communication signals of claim 15, further comprising the steps of:

combining at least one cancellation signal for each of at least two communication protocols that were identified into a combined cancellation signal; and transmitting the combined cancellation signal throughout the cancellation area.

17. The method for managing wireless electronic communication signals of claim 16, further comprising the step of operating a private wireless communication network within the cancellation area and in accordance with a second communication protocol that is different from the communication protocol that was identified.

* * * * *